US008252878B2

(12) United States Patent
Lewis et al.

(10) Patent No.: US 8,252,878 B2
(45) Date of Patent: Aug. 28, 2012

(54) POLYMER

(75) Inventors: Andrew Lennard Lewis, Surrey (GB); Sean Willis, Surrey (GB); Stephen Alister Jones, Surrey (GB); Vincent James O'Byrne, Surrey (GB); David Michael Grey, Surrey (GB); Michael John Driver, Surrey (GB); Samantha Ryan, Surrey (GB); Richard Paul Redman, Surrey (GB)

(73) Assignee: Biocompatibles UK Limited, Surrey (GB)

( * ) Notice: Subject to any disclaimer, the term of this patent is extended or adjusted under 35 U.S.C. 154(b) by 609 days.

(21) Appl. No.: 12/373,412

(22) PCT Filed: Jul. 16, 2007

(86) PCT No.: PCT/EP2007/057335
§ 371 (c)(1),
(2), (4) Date: Feb. 13, 2009

(87) PCT Pub. No.: WO2008/006912
PCT Pub. Date: Jan. 17, 2008

(65) Prior Publication Data
US 2009/0304770 A1 Dec. 10, 2009

(30) Foreign Application Priority Data

Jul. 14, 2006 (EP) .................................. 06253704

(51) Int. Cl.
*C08F 230/02* (2006.01)
*A61F 2/00* (2006.01)
*A61L 33/00* (2006.01)
*A61K 6/083* (2006.01)
(52) U.S. Cl. ........ 526/277; 424/423; 427/2.25; 523/105
(58) Field of Classification Search .................. None
See application file for complete search history.

(56) References Cited

U.S. PATENT DOCUMENTS 6,767,979 B1 * 7/2004 Muir et al. .................. 526/262
2004/0208985 A1 * 10/2004 Rowan et al. ............... 427/2.25

FOREIGN PATENT DOCUMENTS

| EP | 0 594 205 A1 | 4/1994 |
| FR | 2 717 818 A1 | 9/1995 |
| WO | 98/22162 A | 5/1998 |
| WO | 01/01957 A | 1/2001 |

* cited by examiner

*Primary Examiner* — Brian Gulledge
(74) *Attorney, Agent, or Firm* — Sughrue Mion, PLLC

(57) ABSTRACT

A novel class of polymers obtainable by copolymerising a monomer mixture comprising (i) hydrophilic monomer of general formula (I) Y—B—X; (ii) styrene or a substituted styrene, a monomer or mixture of monomers which when polymerized form a polymer with a Tg lower than the Tg of a homopolymer of monomer (I) and lower than the Tg of a homopolymer of monomer (ii); and a monomer having a crosslinkable group is described. The invention also relates to a method for producing such polymers, implants coated with the polymers and methods for forming the same.

25 Claims, 7 Drawing Sheets

POLYMER

The present invention relates to novel polymers and their use as biocompatible coatings for medical devices.

Significant clinical advantages have been recognised in combining medical devices, which perform predominantly physical functions, with drugs or biologics that provide a therapeutic effect. Thus, combination devices may increase treatment efficacy whilst reducing side effects due to loco-regional targeting. The drug-device combination market is very diverse and currently includes product developments in the areas of critical care catheters, bone cements, drug-eluting intravascular devices such as stents, bone graft substitutes, cancer treatments and diabetes management. Often, the key to the success of a combination device is the mechanism by which the drug or biologic is unified with the device and the modulation of its subsequent release. This has been made possible by advances in delivery technologies, in particular coating platforms, which are able to load and release a wide range of actives.

Nowhere is the benefit of the drug-device combination more evident than in the case of the drug-eluting stent (DES). A stent is a scaffolding device that is placed within a lumen to maintain its patency. In the case of a narrowing of a coronary artery, the stent is positioned using a balloon catheter in conjunction with angiography and expanded in situ in order to re-establish the blood-flow and recover the arterial lumen diameter. One complication associated with the use of stents is the re-narrowing (restenosis) of the artery post-stenting due to an 'over-exuberant' healing response. This can occur in around 25-30% of patients. The DES is a combination device that addresses this biological response by loco-regional release of an appropriate pharmaceutical agent to prevent the over-proliferation of cells within the stented segment, and hence preserve the clinical advantage afforded by the stenting procedure. It is important that the pharmaceutical active (or combination of actives) is carefully selected to minimise any unwanted local or systemic toxic effects. Coatings are often used to control the delivery of the active(s) into the local tissue. It is very important that the coating has the appropriate properties to ensure the optimum clinical performance of the combination device. For example, it has been reported that the polymeric coatings used on some commercially available Drug Eluting Stents have the potential to induce inflammation which when present can result in delayed endothelialisation and may be responsible for increase late stent thrombosis. Stent thrombosis is associated with fatal myocardial infarction and so stent coatings must be biocompatible to minimise any inappropriate inflammatory response and thus facilitate re-endothelialisation.

Further, a coating for a drug eluting stent must be very carefully designed since it has to withstand many different conditions during its lifetime. These conditions can be encountered either in the actual manufacturing phase for the DES, in its storage or in its actual usage by the physician. Examples of the different conditions encountered by the DES coating in its lifetime are shown schematically below.

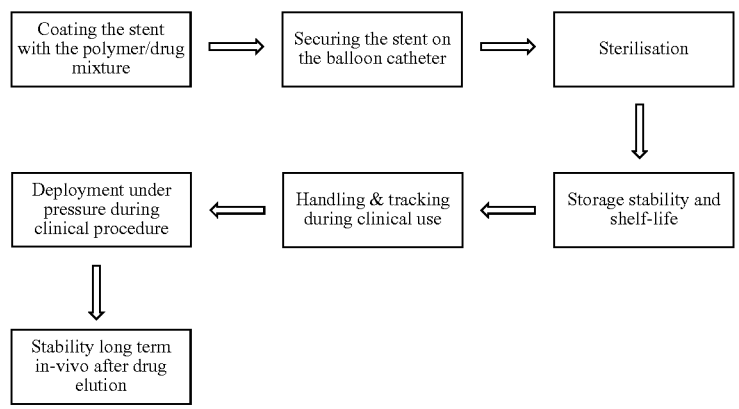

The challenges that a stent coating must overcome are therefore very diverse and are different at each stage in the life of a drug-eluting stent. Some stent coatings evaluated have design flaws and these flaws are caused by a variety of factors. For example, some coatings can be too rigid and brittle. This is especially true when high drug loadings are incorporated into the stent coating. If the coating is too brittle, there is the potential for it to crack when it is expanded during deployment in vivo. In some cases, the coating can delaminate from the surface of the stent. Some stent coatings are designed to be soft and flexible at room temperature. This means that their glass transition temperature (Tg) is below room temperature. Coatings such as these can be hard to process, since elevated temperatures are often used when attaching the stent to the balloon catheter. Under such conditions, the polymers have a tendency to flow and distort. A further consequence of this is that it can result in the polymer adhering to the balloon catheter. When this occurs, the coating can potentially delaminate during stent expansion if its adhesion to the balloon catheter is greater than its adhesion to the stent. Alternatively, if the cohesive strength of the coating is less than its adhesive strength to the balloon catheter, then it can undergo cohesive failure. This again can result in coating material remaining on the balloon catheter surface after deployment of the stent in vivo. It can therefore be seen that the design of a suitable coating for an implant is not a straightforward task, and this is especially true considering the need for the coating to also be biocompatible in vivo. Only a small number of the possible failure modes are described above, but these examples do highlight the varied design challenges faced when designing a suitable DES coating.

In this regard, the present applicant has identified a novel class of polymers which solve these problems.

EP-A-0593561 describes a polymer of one or more radical polymerisable monomers wherein the polymer has pendant groups bearing a centre of permanent charge and other pendant groups capable of stably binding the polymer to a surface. Some of these groups are functional and allow cross-linking of the polymer, e.g. after coating, or allow reaction with other moieties such as ligands. The polymers are described as being useful as biocompatible coatings for devices.

In WO-0101957 stents are coated with a polymer formed by copolymerising zwitterionic monomer, a cross-linkable monomer and comonomer including hydroxyl alkyl acrylates and higher alkyl acrylates.

FR-A-2717818 describes polymers formed from ethylenically unsaturated monomers including a novel acrylic based zwitterionic monomer which also has a dicyanoethylene group and comonomers. In an example the comonomers include around 48% styrene and around 48% 2-ethyehexylacrylate and 3% of the novel monomer. The dicyanoethylene group confers a desirable dispole moment on the zwitterion in the the polymer (i.e. it seems not to be reactive to form cross-links).

In EP-A-0594205 cross-linkable coating polymers have pendant hydrolysable silyl groups and hydroxyl groups which react after coating to cure the polymer. The polymers may also be formed from monomers including styrene and alkylacrylates. The product is a latex paint.

The present invention provides a polymer obtainable by copolymerising a monomer mixture comprising (i) 5 to 40 wt % of a hydrophilic monomer of the general formula (I)

$$Y-B-X \quad (I)$$

wherein B is a straight or branched alkylene, oxaalkylene or oligo-oxa-alkylene chain optionally containing one or more fluorine atoms up to and including perfluorinated chains or, if X contains a carbon-carbon chain between B and the centre of permanent positive charge or if Y contains a terminal carbon atom bonded to B, a valence bond;

X is a zwitterionic group and

Y is an ethylenically unsaturated polymerisable group of the general formula (II)

$$CH_2=\overset{R^1}{\underset{}{C}}-\underset{\underset{O}{\parallel}}{C}-A^1- \quad (II)$$

where:
$R^1$ is hydrogen or a $C_1$-$C_4$ alkyl group;
$A^1$ is —O— or —$NR^2$— wherein $R^2$ is hydrogen or $C_{1-4}$alkyl group or $R^2$ is BX where B and X are as defined above;

(ii) 5 to 40 wt % of styrene or a substituted styrene;
(iii) 10 to 89 wt % of a monomer (a) or mixture of monomers (a), (b) etc, which when polymerised form a polymer having a theoretical Tg calculated using the formula $$\frac{1}{Tg} = \frac{Wa}{Tga} + \frac{Wb}{Tgb} + \ldots$$

wherein Tg=glass transition temperature in Kelvins
Tga and Tgb=glass transition temperature of a homopolymer of "a" and "b" respectively in Kelvins
Wa and Wb=weight fraction of components "a" and "b"

which is lower than the Tg of a homopolymer formed by polymerising monomer (i) and lower than the Tg of a homopolymer formed by polymerising monomer (ii); and (iv) 0.5 to 10 wt % of a monomer having a crosslinkable group wherein after crosslinking the polymer has (a) a Tg (dry) in the range from 15 of 90° C.;
(b) a hydrated modulus at room temperature of at least 5 MPa;
(c) an elongation at break of at least 50% when hydrated at room temperature; and
(d) an equilibrium water content in the range from 10 to 60%.

As detailed above, the first component of the monomer mixture is a hydrophilic monomer. This monomer serves a number of purposes. As a first point it is biocompatible thus making the polymer obtained suitable for use on devices that will ultimately be inserted into the human or animal body. Additionally, when such monomers are polymerised to form a homopolymer, the resulting homopolymer has a high Tg. Thus use of such monomers contributes towards raising the Tg of the final polymer obtained. This gives the polymer a high modulus in its dry cross-linked state. Such monomers tend to be bulky in their molecular structure especially the preferred, zwitterionic monomers, and therefore restrict segmental motion of the polymer backbone which makes the polymer molecules resistant to flow and stronger. The incorporation of hydrophilic monomer also confers hydrophilicity on the polymer, which leads to a significant water content in a hydrogel formed of the polymer. The presence of water plasticises the polymer and modifies the release of drug from a matrix of the polymer.

The preferred zwitterionic groups bear centres of permanent positive charge and negative charge. Some zwitterionic groups mimic the structure of the head group of phospholipids in cells. Without wishing to be bound by theory, it is believed that the presence of such groups at a surface renders the surface more biocompatible. Typically the centre of permanent positive charge is provided by a quaternary nitrogen atom.

In formula (I), the proviso on whether B may be a valence bond ensures that the zwitterionic group in X is not directly bonded to a heteroatom, such as an oxygen or nitrogen atom in Y.

Preferred zwitterionic monomers are therefore of general formula (V) or (VI).

$$CH_2=\overset{R^1}{\underset{}{C}}\underset{\underset{O}{\parallel}}{-C}-A-B-X \quad (V)$$

KBX (VI)

where $R^1$, A, B and X are as defined with reference to formula (I), and K is a group —$(CH_2)_pOC(O)$—, —$(CH_2)_pOC(O)O$—, —$(CH_2)_pNR^8$—, —$(CH_2)_pNR^8C(O)$—, —$(CH_2)_pC(O)NR^8$—, —$(CH_2)_pNR^8C(O)$—, —$(CH_2)_pC(O)NR^8$—, —$(CH_2)_pNR^2C(O)O$—, —$(CH_2)_pOC(O)NR^8$—, —$(CH_2)_pNR^8C(O)NR^8$— (in which the groups $R^8$ are the same or different) —$(CH_2)_pO$—, —$(CH_2)_p$ $SO_3$—, or optionally in combination with B, a valence bond and p is from 1 to 12 and $R^8$ is hydrogen or a $C_{1-4}$ alkyl group.

Preferably in the compounds of formula (V) $R^1$ is hydrogen, methyl, or ethyl, more preferably methyl, so that (V) is an acrylic acid, methacrylic acid or ethacrylic acid derivative.

In the compounds of formula (VI) K may be a valence bond and B a group, K may be a group and B a valence bond, both K and B may be groups, or K and B may together be a valence bond.

Preferably B is a group where K is a valence bond.

Where K is a group then preferably p is from 1 to 6, more preferably 1,2 or 3 and most preferably p is 1. When K is a group —$(CH_2)_pNR^8$—, —$(CH_2)_pNR^8C(O)$—, —$(CH_2)_pC(O)NR^8$, —$(CH_2)_pNR^8C(O)O$—, —$(CH_2)_pOC(O)NR^8$— or —$(CH_2)_pNR^8C(O)NR^8$— then $R^8$ is preferably hydrogen, methyl or ethyl, more preferably hydrogen.

In the compounds of formula (VI) preferably the vinyl group is para to the group —K—B—X.

Preferably B is:

an alkylene group of formula —$(CR^9_2)_a$—, wherein the groups —$(CR^9_2)_a$— are the same or different, and in each group —$(CR^9_2)_a$— the groups $R^9$ are the same or different and each group $R^9$ is hydrogen, fluorine or $C_{1-4}$ alkyl or fluroalkyl, preferably hydrogen, and a is from 1 to 12, preferably 1 to 6;

an oxaalkylene group such as alkoxyalkyl having 1 to 6 carbon atoms in each alkyl moiety, more preferably —$CH_2O(CH_2)_4$—; or an oligo-oxaalkylene group of formula —$[(CR^{10}_2)_bO]_c(CR^{10}_2)_b$— where the groups —$(CR^{10}_2)$— are the same or different and in each group —$(CR^{10}_2)$— the groups $R^{10}$ are the same or different and each group $R^{10}$ is hydrogen, fluorine or $C_{1-4}$ alkyl or fluoroalkyl, preferably hydrogen, and b is from 1 to 6, preferably 2 or 3 and c is from 2 to 11, preferably 2 to 5; or if X contains a carbon-carbon chain between B and the zwitterion or if Y contains a terminal carbon atom, a valence bond.

Preferred groups B include alkylene, oxaalkylene and oligo-oxaalkylene groups of up to 12 carbon atoms optionally containing one or more fluorine atoms. Where the polymer is not intended for coating a hydrophobic surface, and therefore is not intended to be bound by physisorption to a surface, then preferably B is an alkylene, oxaalkylene or oligo-oxaalkylene group which does not contain any fluorine atoms.

In compounds of formula (VI) it is preferred that K and B contain up to 12 carbon atoms in total.

Preferred zwitterionic groups are the groups of formula (VIIB), (VIIC), (VIID), (VIIE) and (VIIF) as defined below: monomers containing such groups may be used in combination with further monomers containing groups capable of binding to a surface, to provide a copolymer of these groups of formula (VIIB)-(VIIF) and especially (VIIC) are particularly preferred.

In addition, groups of formula (VIIIA), (VIIIB) and (VIIIC) are preferred as monomers containing both a centre of permanent positive charge and an alkyl, fluoroalkyl or siloxane group capable of binding to a surface by physisorption.

The groups of formula (VIIB) are:

(VIIB)

where the groups $R^{11}$ are the same or different and each is hydrogen or $C_{1-4}$ alkyl and d is from 2 to 4.

Preferably the groups $R^{11}$ are the same. It is also preferable that at least one of the groups $R^{11}$ is methyl, and more preferable that the groups $R^{11}$ are both methyl.

Preferably d is 2 or 3, more preferably 3.

When X is a group of formula (VIIB) preferably B is a group of formula —$(CR^9_2)$— or —$(CR^9_2)_2$— eg. —$(CH_2)$— or —$(CH_2CH_2)$—.

The groups of formula (VIIC) are:

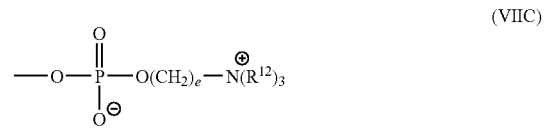

(VIIC)

where the groups $R^{12}$ are the same or different and each is hydrogen or $C_{1-4}$ alkyl, and e is from 1 to 4.

Preferably the groups $R^{12}$ are the same. It is also preferable that at least one of the groups $R^{12}$ is methyl, and more preferable that the groups $R^{12}$ are all methyl.

Preferably e is 2 or 3, more preferably 2.

When X is a group of formula (VIIC) preferably B is a group of formula —$(CR^9_2)$— or —$(CR^9_2)_2$—, eg. —$(CH_2)$— or —$(CH_2CH_2)$—.

The groups of formula (VIID) are:

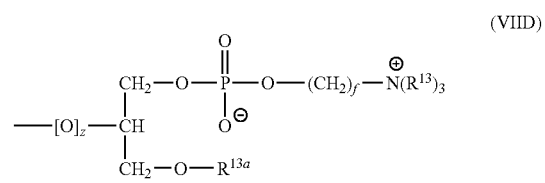

(VIID)

wherein the groups $R^{13}$ are the same or different and each is hydrogen or $C_{1-4}$ alkyl, $R^{13a}$— is hydrogen or, more preferably, a group —$C(O)B^1R^{13b}$ where $R^{13b}$ is hydrogen or methyl, preferably methyl, $B^1$ is a valence bond or straight or branched alkylene, oxaalkylene or oligo-oxaalkylene group, and f is from 1 to 4; and if B is other than a valence bond Z is 1 and if B is a valence bond Z is O, if X is directly bonded to an oxygen or nitrogen atom and otherwise Z is 1.

Preferably the groups $R^{13}$ are the same. It is also preferable that at least one of the groups $R^{13}$ is methyl, and more preferable that the groups $R^{13}$ are all methyl.

Preferably f is 1 or 2, more preferably 2.

Preferably $B^1$ is:

a valence bond;

an alkylene group of formula —$(CR^{9a}_2)_{aa}$—, wherein the groups —$(CR^{9a}_2)$— are the same or different, and in each group $(CR^{9a}_2)$— the groups $R^{9a}$— are the same or

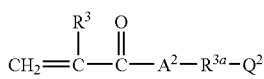

(III)

different and each group $R^{9a}$— is hydrogen or $C_{1-4}$ alkyl, preferably hydrogen, and aa is from 1 to 12, preferably 1 to 6;

an oxaalkylene group such as alkoxyalkyl having 1 to 6 carbon atoms in each alkyl moiety, more preferably —$CH_2O(CH_2)_4$—; or an oligo-oxaalkylene group of formula —$[(CR^{10a}_2)_{ba}O]_{ca}$— where the groups —$(CR^{10a}_2)$— are the same or different and in each group —$(CR^{10a}_2)$— the groups $R^{10a}$ are the same or different and each group $R^{10a}$ is hydrogen or $C_{1-4}$ alkyl, preferably hydrogen, and ba is from 1 to 6, preferably 2 or 3, and ca is from 1 to 12, preferably 1 to 6.

Preferred groups $B^1$ include a valence bond and alkylene, oxaalkylene and oligo-oxaalkylene groups of up to 12 carbon atoms.

Preferably B and $B^1$ are the same.

When X is a group of formula (VIID) preferably B is a group of formula —$[(CR^{10}_2CR^{10}_2)_cO_b]CR^{10}_2CR^{10}_2$—, eg. —$(CH_2CH_2O)_c(CH_2CH_2)$—.

The groups of formula (VIIE) are:

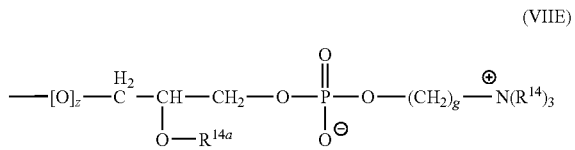

(VIIE)

wherein the groups $R^{14}$ are the same or different and each is hydrogen or $C_1$-$C_4$ alkyl, $R^{14a}$ is a hydrogen or, more preferably, a group —$C(O)B^2R^{14b}$, $R^{14b}$ is hydrogen or methyl, preferably methyl, $B^2$ is a valence bond or a straight or branched alkylene, oxaalkylene or oligo-oxaalkylene group, and g is from 1 to 4; and if B is other than a valence bond Z is 1 and if B is a valence bond Z is O if X is directly bonded to an oxygen or nitrogen atom and otherwise Z is 1.

Preferably the groups $R^{14}$ are the same. It is also preferable that at least one of the groups $R^{14}$ is methyl, and more preferable that the groups $R^{14}$ are all methyl.

Preferably g is 1 or 2, more preferably 2.

Preferably $B^2$ is:

a valence bond;

an alkylene group of formula —$(CR^{9b}_2)_{ab}$—, wherein the groups —$(CR^{9b}_2)$— are the same or different, and in each group —$(CR^{9b}_2)$— the groups $R^{9b}$ are the same of different and each group $R^{9b}$ is hydrogen or $C_{1-4}$ alkyl, preferably hydrogen, and ab is from 1 to 12, preferably 1 to 6;

an oxaalkylene group such as alkoxyalkyl having 1 to 6 carbon atoms in each alkyl moiety, more preferably —$CH_2O(CH_2)_4$—; or an oligo-oxaalkylene group of formula —$(CR^{10b}_2)_{bb}O]_{cb}$— where the groups —$(CR^{10b}_2)$— are the same or different and in each group —$(CR^{10b}_2)$— the groups $R^{10b}$ are the same or different and each group $R^{10b}$ is hydrogen or $C_{1-4}$ alkyl, preferably hydrogen, and bb is from 1 to 6, preferably 2 or 3, and cb is from 1 to 12, preferably 1 to 6.

Preferred groups $B^2$ include a valence bond and alkylene, oxaalkylene and oligo-oxaalkylene groups of up to 12 carbon atoms.

Preferably B and $B^2$ are the same.

When X is a group of formula (VIIE) preferably B is a group of formula —$[(CR^{10}_2CR^{10}_2)_bO]_cCR^{10}_2CR^{10}_2$—, eg. —$(CH_2CH_2O)_cCH_2CH_2$—.

The groups of formula (VIIF) are:

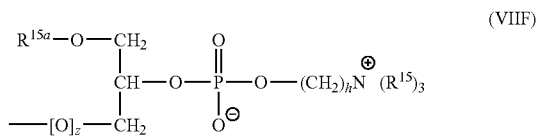

(VIIF)

wherein the groups $R^{15}$ are the same or different and each is hydrogen or $C_{1-4}$ alkyl, $R^{15a}$ is hydrogen or, more preferably, a group —$C(O)B^3R^{15b}$ where $R^{15b}$ is hydrogen or methyl, preferably methyl, $B^3$ is a valence bond or a straight or branched—alkylene, oxaalkylene or oligo-oxaalkylene group, and h is from 1 to 4; and if B is other than a valence bond Z is 1 and if B is a valence bond Z is O if X is directly bonded to the oxygen or nitrogen and otherwise Z is 1.

Preferably the groups $R^{15}$ are the same. It is also preferable that at least one of the groups $R^{15}$ is methyl, and more preferable that the groups $R^{15}$ are all methyl.

Preferably h is 1 or 2, more preferably 2.

Preferably $B^3$ is:

a valence bond;

an alkylene group of formula —$(CR^{9c}_2)_{ac}$—, wherein the groups —$(C^{9c}_2)$— are the same or different and in each group $(C^{9c}_2)$— the groups $R^{9c}$ are the same or different and each group $R^{9c}$ is hydrogen or $C_{1-4}$ alkyl, preferably hydrogen, and ac is from 1 to 12, preferably 1 to 6;

an oxaalkylene group such as alkoxyalkyl having 1 to 6 carbon atoms in each alkyl moiety, more preferably —$CH_2O(CH_2)_4$—; or an-oligo-oxaalkylene group of formula —$[(CR^{10c}_2)_{bc}O]_{cc}$— where the groups —$(CR^{10c}_2)$— are the same or different and in each group —$(CR^{10c}_2)$— the groups $R^{10c}$ are the same or different and each group $R^{10c}$ is hydrogen or $C_{1-4}$ alkyl, preferably hydrogen, and bc is from 1 to 6, preferably 2 or 3, and cc is from 1 to 12, preferably 1 to 6.

Preferred groups $B^3$ include a valence bond and alkylene, oxaalkylene and oligo-oxaalkylene groups of up to 12 carbon atoms.

Preferably B and $B^3$ are the same.

When X is a group of formula (IVF) preferably B is a group of formula —$[(CR^{10}_2CR^{10}_2)_bO]_cCR^{10}_2CR^{10}_2$—, eg. —$(CH_2CH_2O)_cCH_2CH_2$—.

Further zwitterionics groups are of formula (VIIIA), (VIIIB) and (VIIIC). These groups also contain an alkyl or fluoroalkyl group capable of binding to a surface by physisorption. Monomers containing such a group are therefore particularly suitable for use in the polymers of the invention, optionally without separate comomoners containing a group capable of binding to a hydrophobic surface by physisorption.

The groups of formula (VIIIA) are:

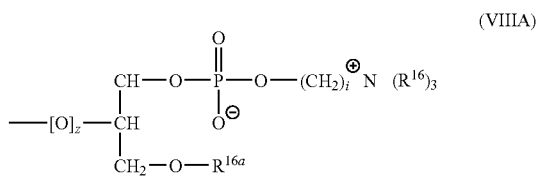

(VIIIA)

wherein the groups $R^{16}$ are the same or different and each is hydrogen or $C_{1-4}$ alkyl, $R^{16a}$ is either (a) a group —$[C(O)]_{vv}(CR^{16b}_2)_{ww}(SiR^{16c}_2)(OSiR^{16c}_2)_w R^{16c}$ in which each group $R^{16b}$ is the same or different and is hydrogen or alkyl of 1 to 4 carbon atoms, each group $R^{11c}$ is the same or different and is alkyl of 1 to 4 carbon atoms or aralkyl, for example benzyl or phenethyl, vw is 0 or 1, ww is from 0 to 6 with the proviso that vw and ww are not both 0, and vv is from 0 to 49;

(b) a group of formula —$C(O)B^4$—$R^{16d}$, in which $R^{16d}$ is hydrogen or methyl, $B^4$ is a valence bond or straight or branched alkylene, oxaalkylene or oligo-oxaalkalyene group optionally containing one or more fluorine atoms, and containing from 6 to 24, preferably 6 to 18 carbon atoms;

i is from 1 to 4; and if B is other than a valence bond Z is 1 and if B is a valence bond Z is 0 if X is directly bonded to an oxygen or nitrogen atom and otherwise Z is 1.

Preferably the groups $R^{16}$ are the same. It is also preferable that at least one of the groups $R^{16}$ is methyl, and more preferable that the groups $R^{16}$ are all methyl.

Preferably i is 1 or 2, more preferably 2.

Where $R^{16a}$ is a siloxane group as defined in (a) above, each group $(CR^{16b}_2)$ may be the same or different, preferably the same, and preferably each group $R_{16b}$ is hydrogen. Preferably ww is from 2 to 4, and is most preferably 3 when vw is 0 or 2 when vw is 1. Each group $(SiR^{16c}_2)$ may be the same or different, preferably the same, and preferably each group $R^{16c}$ is methyl.

Preferably vv is from 4 to 29.

Preferably the group $R^{16a}$ is a group —$C(O)B^4R^{16d}$ as defined above. In such a case, preferably $B^4$ is:

a valence bond;

an alkylene group of formula —$(CR^{9d}_2)_{ad}$— wherein the groups —$(CR^{9d}_2)$— are the same or different, and in each group —$(CR^{9d}_2)$— the groups $R^{9d}$ are the same or different and each group $R^{8d}$ is hydrogen, fluorine or $C_{1-4}$ alkyl or fluoroalkyl, preferably hydrogen or fluorine, and ad is from 1 to 24, preferably to 18;

an oxaalkylene group such as alkoxyalkyl having 1 to 6 carbon atoms and optionally one or more fluorine atoms in each alkyl moiety, or an oligo-oxaalkylene group of formula —$[(CR^{10d}_2)_{bd}O]_{cd}$— where the groups —$(CR^{10d}_2)$— are the same or different and in each group —$(CR^{10d}_2)$— the groups $R^{10d}$ are the same or different and each group $R^{10d}$ is hydrogen, fluorine or $C_{1-4}$ alkyl or fluoroalkyl, preferably hydrogen or fluorine, and bd is from 2 to 6, preferably 3 or 4, and cd is from 1 to 12, preferably 1 to 6.

When $B^4$ is a group —$[(CR^{10d}_2)_{bd}O]_{cd}$— wherein all the groups $R^{10d}$ are hydrogen and in all the groups —$[(CR^{10d}_2)_{bd}O]$— bd is 2, the residues of the monomer of formula (VIIIA) are not able to form strong secondary valence interactions with hydrophobic surfaces. Whilst residues of such monomers may be included in the polymers of the invention, it is usually also necessary to include residues of monomers which are capable of forming strong secondary valence interactions if such interactions are to bind a polymer to a surface.

Monomers which have groups VIIIA containing oligo (higher alkylene) oxide moieties can be used to provide strong secondary valence interactions, so can monomers which contain oligo alkylene oxide moieties in which at least 50, preferably 70, more preferably 90 mol % of individual alkylene oxide units contain 3 or more carbon atoms. Thus, for instance a mixed oligo(ethylene oxide/propylene oxide) side chain could be used provided that there are more propylene oxide units than ethylene oxide units.

When $B^4$ is a group —$(CR^{10}_2)_{bd}O]_{cd}$— then preferably bd is 2 in only 50, preferably 70, more preferably 90 mole % or less of the residues —$[(CR^{10d}_2)_{bd}O]$—.

When the group —$B^4$—$R^{16a}$ is a group capable of forming strong secondary valence interactions with a surface, then monomers containing a group (VIIIA) may be particularly suitable for use as zwitterionic monomers containing an alkyl or fluoroalkyl group optionally containing one or more etheric oxygen atoms. Preferably, in such a case —$B^4$—$R^{16a}$ is an alkyl group optionally containing one or more etheric oxygen atoms and preferably 6 or more carbon atoms or a fluoroalkyl group optionally containing one or more etheric oxygen atoms and preferably 6 or more carbon atoms.

In one embodiment B and $B^4$ may be the same.

The groups of formula (VIIIB) are:

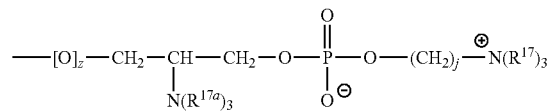

(VIIIB)

wherein the groups $R^{17}$ are the same or different and each is hydrogen or $C_1$-$C_4$ alkyl, $R^{17a}$ is either (a) a group —$[C(O)]_{tu}(CR^{17b}_2)_{uu}(SiR^{17c}_2)(OSiR^{17c}_2)_{tt} R^{17c}$ in which each group $R^{17b}$ is the same or different and is hydrogen or alkyl of 1 to 4 carbon atoms, each group $R^{17c}$ is the same or different and is alkyl of 1 to 4 carbon atoms or aralkyl, for example benzyl or phenethyl, tu is 0 or 1, uu is from 0 to 6, with the proviso that tu and uu are not both 0, and tt is from 0 to 49; or (b) a group of formula —$C(O)B^5$—$R^{17d}$, in which $R^{17d}$ is hydrogen or methyl, $B^5$ is a valence bond or a straight or branched alkylene, oxaalkylene or oligo-oxaalkylene group optionally containing one or more fluorine atoms and from 6 to 24 carbon atoms, more preferably 6 to 18 carbons atoms, j is from 1 to 4; and if B is other than a valence bond, Z is 1 and if B is a valence bond Z is 0 if X is directly bonded to an oxygen or nitrogen atom and otherwise Z is 1.

Preferably the groups $R^{17}$ are the same. It is also preferable that at least one of the groups $R^{17}$ is methyl, and more preferable that the groups $R^{17}$ are all methyl.

Preferably j is 1 or 2, more preferably 2.

Where $R^{17a}$ is a siloxane group as defined in (a) above, each group $(CR^{17b}_2)$ may be the same or different, preferably the same, and preferably each group $R^{17b}$ is hydrogen. Preferably uu is from 2 to 4, and is most preferably 3 when tu is 0 or 2 when tu is 1. Each group $(SiR^{17c}_2)$ may be the same or different, preferably the same, and preferably each group $R^{17c}$ is methyl.

Preferably tt is from 4 to 29.

Preferably the group $R^{17a}$ is a group —$C(O)B^4R^{17d}$ as defined above. In such a case, preferably $B^5$ is:

a valence bond;

an alkylene group of formula —$(CR^{9e}_2)_{ae}$—, wherein the groups —$(CR^{9e}_2)$— are the same or different, and in each group —$(CR^{9e}_2)$— the groups $R^{9e}$ are the same of different and each group $R^{9e}$ is hydrogen, fluorine or $C_{1-4}$ alkyl, or fluoroalkyl, preferably hydrogen or fluorine, and ae is from 1 to 24, preferably 6 to 18;

an oxaalkylene group such as alkoxyalkyl having 1 to 6 carbon atoms and optionally one or more fluorine atoms in each alkyl moiety; or an oligo-oxaalkylene group of formula —[(CR$^{10e}_2$)$_{be}$O]$_{ce}$— where the groups —(CR$^{10e}_2$)— are the same or different and in each group —(CR$^{10e}_2$)— the groups R$^{10e}$ are the same or different and each group R$^{10e}$ is hydrogen, fluorine or C$_{1-4}$ alkyl or fluoroalkyl, preferably hydrogen or fluorine, and be is from 2 to 6, preferably 3 or 4, and ce is from 1 to 12, preferably 1 to 6.

When B$^5$ is a group —[(CR$^{10e}_2$)$_{be}$O]$_{ce}$— wherein all the groups R$^{10e}$ are hydrogen and in all the groups [CR$^{10e}_2$)$_{be}$O] be is 2, the residues of the monomer of formula (VIIIB) are not able to form strong secondary valence interactions with hydrophobic surfaces. Residues of monomers which are capable of forming such strong secondary valence interactions may assist in binding a polymer to a surface. Monomers which have groups containing oligo (higher alkylene) oxide moieties can be used to provide strong secondary valence interactions, so can monomers which contain oligo alkylene oxide moieties in which at least 50, preferably 70, more preferably 90 mol % of individual alkylene oxide units contain 3 or more carbon atoms. Thus, for instance a mixed oligo(ethylene oxide/propylene oxide) side chain could be used provided that there are more propylene oxide units than ethylene oxide units.

When B$^5$ is a group —[(CR$^{10e}_2$)$_{be}$O]$_{ce}$— then preferably be is 2 in only 50, preferably 70, more preferably 90 mole % or less of the residues —[(CR$^{10b}_2$)$_{be}$O]—.

When the group —B$^5$—R$^{17a}$ is a group capable of forming strong secondary valence interactions with a surface, then monomers containing a group (VIIIB) may be particularly suitable for use as zwitterionic monomers containing an alkyl or fluoroalkyl group optionally containing one or more etheric oxygen atoms. Preferably, in such a case —B$^5$—R$^{12a}$ is an alkyl group optionally containing one or more etheric oxygen atoms and preferably 6 or more carbon atoms or a fluoroalkyl group optionally containing one or more etheric oxygen atoms and preferably 6 or more carbon atoms.

In one embodiment B and B$^5$ may be the same.

The groups of formula (VIIIC) are:

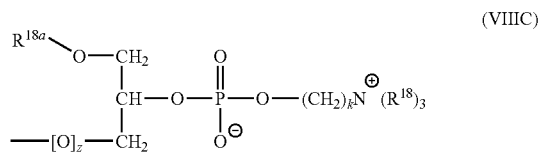

(VIIIC)

wherein the groups R$^{18}$ are the same or different and each is hydrogen or C$_{1-4}$ alkyl, R$^{18a}$ is either (a) a group —[C(O)]$_{rs}$(CR$^{18b}_2$)$_{ss}$(SiR$^{18c}_2$)(OSiR$^{18c}_2$)$_{rr}$ R$^{18c}$ in which each group R$^{18b}$ is the same or different and is hydrogen or alkyl of 1 to 4 carbon atoms, each group R$^{13c}$ is the same or different and is alkyl of 1 to 4 carbon atoms or aralkyl, for example benzyl or phenethyl, rs is 0 or 1, ss is from 0 to 6, with the proviso that rs and ss are not both 0, and rr is from 0 to 49; or (b) a group of formula —C(O)B$^6$—R$^{18d}$ in which R$^{18a}$ is hydrogen or methyl, B$^6$ is a valence bond or a straight or branched alkylene, oxaalkylene or oligo-oxaalkylene group optionally containing one or more fluorine atoms and from 6 to 24, more preferably 6 to 18 carbon atoms and k is from 1 to 4; and if B is other than a valence bond, Z is 1 and if B is a valence bond Z is 0 if X is directly bonded to an oxygen or nitrogen atom and otherwise Z is 1.

Preferably the groups R$^{13}$ are the same. It is also preferable that at least one of the groups R$^{13}$ is methyl, and more preferable that the groups R$^{13}$ are all methyl.

Preferably k is 1 or 2, more preferably 2.

Where R$^{18a}$ is a siloxane group as defined in (a) above, each group (CR$^{18b}_2$) may be the same or different, preferably the same and preferably each group R$^{18b}$ is hydrogen. Preferably ss is from 2 to 4, and is most preferably 3 when rs is 0 or 2 when rs is 1. Each group (SiR$^{18c}_2$) may be the same, or different, preferably the same, and preferably each group R$^{18c}$ is methyl. Preferably rr is from 4 to 29.

Preferably the group R$^{11a}$ is a group —C(O)B$^6$R$^{18d}$ as defined above. In such a case, preferably B$^6$ is:

a valence bond;

an alkylene group of formula —(CR$^{9f}_2$)$_{af}$—, wherein the groups —(CR$^{9f}_2$)— are the same or different, and in each group (CR$^{9f}_2$)— the groups R$^{9f}$ are the same or different and each group R$^{9f}$ is hydrogen, fluorine or C$_{1-4}$ alkyl or fluoroalkyl, preferably hydrogen or fluorine, and is from 1 to 24, preferably 6 to 18;

an oxaalkylene group such as alkoxyalkyl having 1 to 6 carbon atoms and optionally one or more fluorine atoms in each alkyl moiety; or an oligo-oxaalkylene group of formula —[(CR$^{10f}_2$)$_{bf}$O]$_{cf}$— where the groups —(CR$^{10f}_2$)— are the same or different and in each group —(CR$^{10}_2$)— the groups R$^{10f}$ are the same or different and each group R$^{10f}$ is hydrogen, fluorine or C$_{1-4}$ alkyl or fluoroalkyl, preferably hydrogen or fluorine, and bf is from 2 to 6, preferably 3 or 4, and cf is from 1 to 12, preferably 1 to 6.

When B$^6$ is a group —[(CR$^{10f}_2$)$_{bf}$O]$_{cf}$— wherein all the groups R$^{10f}$ are hydrogen and in all the groups [(CR$^{10c}_2$)$_{bf}$O] bf is 2, the residues of the monomer of formula (VIIIC) are not able to form strong secondary valence interactions with hydrophobic surfaces. Whilst residues of such monomers may be included in the polymers of the invention, it is also necessary to include residues of monomers which are capable of forming such strong secondary valence interactions if such interactions are to bind a polymer to a surface. Monomers which have groups containing oligo(higher alkylene) oxide moieties can be used to provide the necessary strong secondary valence interactions, so can monomers which contain oligo alkylene oxide moieties in which at least 50, preferably 70, more preferably 90 mol % of individual alkylene oxide units contain 3 or more carbon atoms. Thus, for instance a mixed oligo(ethylene oxide/propylene oxide) side chain could be used provided that these are more propylene oxide units then ethylene oxide units.

When B$^6$ is a group —[(CR$^{10f}_2$)$_{bf}$O]$_{cf}$— then preferably bf is 2 in only 50, preferably 70, more preferably 90 mol % or less of the residues —[(CR$^{10f}_2$)$_{bf}$O]—.

When the group —B$^6$—R$^{18a}$— is a group capable of forming strong secondary valence interactions with a surface, then monomers containing a group (VC) may be particularly suitable for use as zwitterionic monomers containing an alkyl or fluoroalkyl group optionally containing one or more etheric oxygen atoms. Preferably, in such a case —B$^6$—R$^{18a}$ is an alkyl group optionally containing one or more etheric oxygen atoms and preferably 6 or more carbon atoms or a fluoroalkyl group optionally containing one or more etheric oxygen atoms and preferably 6 or more—carbon atoms.

In one embodiment B and B$^6$ may be the same.

Particular examples of preferred zwitterionic monomers are 2(methacryloyloxy)ethyl-2'(trimethylammonium)ethyl phosphate inner salt and 1[4(4'-vinylbenzyloxy)butane]2"
(trimethylammonium)ethyl phosphate inner salt.

Zwitterionic monomers such as those of formula (V) and
(VI) may be prepared by conventional techniques using
known reactions, for example using a suitable substituted
alkyl (alk)acrylate or suitable substituted styrene as precursor. Examples of suitable substituted alkyl (alk)acrylates
include dimethylaminoethyl(meth)acrylate and 2-hydroxyethyl(meth)acrylate.

Monomers of formula (V) or (VI) containing a group of
formula (VIID) in which $R^{13a}$ is $-C(O)B^1R^{13b}$ may be prepared by selective acylation of glycerophosphorylcholine or
analogues thereof at the primary hydroxyl group with an
activated acid derivative such as an acid anhydride $O(C(O)
B^1R^{13b})_2$ or an acid halide $R^{13b}B^1COHal$ where $B^1$ and $R^{13b}$
are as defined above and Hal is halogen, followed by acylation of the secondary hydroxyl group with an appropriate
acylating agent, for example methacryloyl chloride. Purification, for example by column chromatography on a suitable
support, may be performed after each acylation or after the
second acylation only. Suitable activated acid derivatives
include acid anhydrides, acid halides, reactive esters and imidazolides. The acylations may be performed in a suitable
anhydrous, aprotic solvent, for example N,N-dimethylformamide, optionally in the presence of a suitable non-nucleophilic base, for example triethylamine.

Alternatively, the primary alcohol group in glycerophosphoryl choline or an analogue thereof may be blocked by
reaction with a suitable protecting group reagent, for example
t-butyidimethylsilyl chloride, under standard conditions and
the secondary hydroxy group then treated with an acylating
agent such as methacryloyl chloride. The t-butyidimethylsilyl
protecting group may be removed by treatment with a dilute
organic or mineral acid, for example p-toluene sulphonic
acid, hydrochloric acid or with tetra-butylammonium fluoride. The deblocked primary hydroxyl group may then be
treated with an activated acid derivative such as an acid anhydride $O(C(O)B^1R^{13b})_2$ or acid halide $R^{13b}B^1COHal$ where $B^1$
and $R^{13b}$ are as defined above, and Hal is halogen.

Analogues of glycerophosphorylcholine (compounds of
formula (V) or (VI) containing a group (VIID) where $R^{13a}$ is
hydrogen) may be prepared by reaction of phosphorus oxychloride with a bromoalcohol in an inert aprotic solvent, such
as dichloromethane, to give a bromoalkylphosphorodichloridate. The dichloro derivative thus produced may then be
treated with an appropriately protected glycerol derivative,
for example 2,2-dimethyl 1,3-dioxolane-4-methanol, in the
presence of a base, for example triethylamine, followed by
acid hydrolysis to give a bromoalkylphosphoroglycerol
derivative. This may then be treated with an amine $NR^{13}_3$,
where $R^{13}$ is as defined above, for example trimethylamine, to
generate the glycerophosphorylcholine analogue. This preparation is depicted in the following scheme.

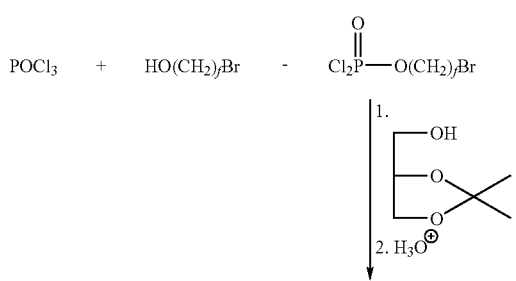

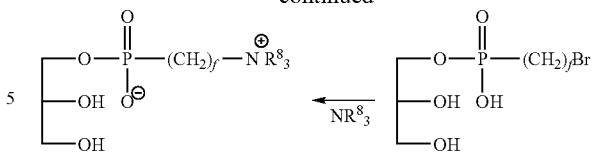

where $R^{13}$ and f are as defined in relation to groups of formula
(VIID).

Monomers of formula (V) or (VI) containing a group of
formula (VIIE) in which $R^{14a}$ is $-C(O)B^2R^{14b}$ may be prepared by the selective acylation of glycerophosphorylcholine
or an analogue thereof at the primary hydroxyl group with for
example, methacryloyl chloride followed by reaction at the
secondary hydroxyl group using an activated acid derivative,
such as an acid halide $O(C(O)B^2R^{14b})_2$ or an acid halide
$R^{14b}B^2COHal$, where $B^2$ and $R^{14b}$ are as defined above and
Hal is halogen. The intermediates and final products may be
purified, as necessary using column chromatography. Optionally, protecting group strategy, similar to that outlined above
in relation to production of monomers containing a group of
formula (VIID) may be employed.

Monomers of formula (V) or (VI) containing a group of
formula (VIIF) may be prepared in an analogous manner to
monomers containing groups of formula (VIID) or (VIIE).

Monomers of formula (V) or (VI) containing a group of
formula (VIIIA), (VIIIB) or (VIIIC) may be prepared by
direct analogy with methods described for monomers containing groups of formula (VIID), (VIIE) and (VIIF) respectively.

Monomer (i) is included in the monomer mixture in an
amount in the range from 5 to 40 wt %. By altering the amount
of hydrophilic monomer present, the degree to and rate at
which the polymer formed absorbs water is varied. The polymers of the present invention have a water content in the range
from 10 to 60% once cross-linked. The water content and rate
of hydration of the polymer is important for several reasons.
Where in the dry state, a polymer shows limited flexibility,
upon water absorption, plasticisation is observed which
reduces the effective Tg of the polymer. Secondly, the water
content of the polymer modifies the rate of drug dissolution
from the polymer. The rate at which the polymer absorbs
water is also important. In the clinic, the device may be
introduced into the body, positioned and then deployed in a
very short time period. In the case of a stent, this could be
under 60 seconds and therefore rapid hydration of the coating
is important to ensure plasticization and a reduced risk of the
coating being too brittle which could lead to cracking and
delamination of the coating from the device surface. In addition, the appropriate degree of flexibility that the coating
exhibits can be further controlled by changing its overall Tg
and therefore the appropriate balance between these properties is important.

The second monomer component of the monomer mixture
is styrene or a substituted styrene. Styrene is a further
example of a monomer which tends to increase the Tg of a
polymer formed from it and is included in order to ensure that
the resulting polymer has the required hardness.

The mixture also includes 10 to 89 wt % of a monomer (a)
or mixture of monomers, (a, b . . . ) which when polymerised
form a polymer having a Tg as calculated using $$\frac{1}{Tg} = \frac{Wa}{Tga} + \frac{Wb}{Tgb} + \ldots etc$$

wherein Tg=glass transition temperature in Kelvins
Tga and Tgb=glass transition temperature of a homopolymer of a and b respectively
Wa and Wb=weight fraction of components "a" and "b"
which is lower than the Tg of a homopolymer formed by polymerising monomer (I) and lower than the Tg of a homopolymer formed by polymerising monomer (ii).

Where monomer (iii) comprises a mixture of monomers a to n, the Tg is calculated using $$\frac{1}{Tg} = \frac{Wa}{Tga} + \ldots + \frac{Wn}{Tgn}$$

As well as influencing the Tg of the final polymer obtained, the monomer (iii) also helps to balance the hardness and the flexibility of the polymer obtained. This monomer or mixture of monomers is referred to below as low Tg monomer.

Preferably the monomer(s) (iii) include at least one monomer selected from the group consisting of $C_{1-24}$ alkyl(alk)acrylates and -(alk)acrylamides optionally substituted with one or more hydroxyl groups.

More preferably the monomer (a) or each of monomers a), b) ... n) is a $C_{4-12}$ alkyl(alk)-acrylate or hydroxy $C_{4-12}$-alkyl (alk)acrylate. Preferably the (alk)acrylate is an acrylate.

For example, the addition of hydroxy butyl acrylate and/or butyl acrylate results in a reduction in the overall Tg of the polymer formed. When incorporated into a polymer chain, acrylates (and acrylamides), such as butyl acrylate and hydroxyl butyl acrylate make the polymer more flexible. The addition of these monomers effectively reduces the Tg of the final polymer and make it more flexible. If the Tg of the resulting polymer in the dry state is room temperature for example, it will deform under applied stress at this temperature. By changing the ratio of the different monomers the overall Tg and therefore mechanical properties of the polymer can be modified to suit the manufacturing process used and the final properties required for the polymer once cross-linked.

The monomer(s) (iii) may also include a monomer selected from the group consisting of $C_{1-24}$ alkyl(alk)acrylates, PEG acrylates and vinyl acetate, preferably selected from ethyl acrylate, ethyl methacrylate, methyl methacrylate, 2-hydroxyethyl methacrylate, 2-ethyl hexyl acrylate, hydroxypropyl methacrylate, lauryl methacrylate, PEG1000 methacrylate, PEG2000 methacrylate and vinyl acetate.

When developing a coating for an implant, there are various challenges which the skilled person has to overcome. More specifically, the coating has to be able to withstand various different processing conditions during its lifetime.

The first consideration is that it must be possible to apply the polymer to the implant in an even manner so as to form a complete homogenous film over the surface or surfaces as desired. Once applied to the surface and after the subsequent step of cross linking, the coating also needs to be robust enough to withstand general transport and handling.

In the case where the coated implant is a stent, the next stage in processing would be to attach the coated stent to a balloon catheter for delivery. Many different techniques can be used to attach the coated stent to a balloon catheter. Often they involve bringing the two into intimate contact and securing them together by crimping and/or heat setting. The polymer coating needs to be able to withstand the high temperatures and pressures involved with this. If the Tg of the polymer coating is too low, then the polymer may flow during crimping and from bridges between adjacent stent struts. The polymer coating according to the present invention avoids this by having a Tg which is very similar to the processing temperature. Furthermore, as discussed above, the incorporation of cross-links in the coating reduces the likelihood of this occurring.

Medical devices tend to undergo a final stage of sterilisation prior to packaging. The polymer coating needs to be able to withstand the sterilisation process. The polymer coating also needs to be stable upon storage. A problem encountered on storage is so called "cold flow" wherein the coating deforms over time as the polymer molecules undergo flow during storage. The polymer coating of the present invention avoids this by having a relatively high Tg and cross-links.

The final stages in the processing of a stent are tracking during the clinical procedures to position the stent as required and deployment by expansion of the balloon catheter. For both steps, the coating needs to be flexible and tough. The coated stent also needs to remain at the point of deployment and thus the coating should have long term chemical and dimensional stability in vivo.

In order to satisfy all of the above detailed considerations, preferably, once cross-linked, the biocompatible polymer has:
(a) a Tg (dry) in the range from 15 to 90° C., preferably 15 to 70° C., preferably 20 to 50° C.;
(b) a hydrated modulus at room temperature of more than 5 MPa, preferably more than 20 MPa;
(c) an elongation at break hydrated at 37° C. of more than 50%; preferably more than 150%, more preferably more than 250%; and
(d) a water content in the range from 10 to 60%.

As noted above, in order to be suitable for use as a coating for stents, the final polymer produced should preferably have a Tg, when dry, in the range from 15 to 90° C., preferably 15-70° C., more preferably 20-50° C. Additionally, it should have a hydrated modulus at room temperature of more than 5 MPa, preferably more than 15 MPa, more preferably more than 20 MPa, and an elongation at break more than 50%, preferably greater than 150%, more preferably greater than 250%. The method for testing the modulus and elongation at break is set out below.

The glass transition temperature of homopolymers of the typical monomers used to modify the properties of the polymer are shown in Table 1 below:

TABLE 1

| Monomer | Tg(° C.) of homopolymer |
|---|---|
| Styrene $CH_2-\overset{R^3}{\underset{|}{C}}-\overset{O}{\underset{\|}{C}}-A^2-R^{3a}-Q^2$ (III) | 100 |
| Methyl methacrylate | 105 |
| Butyl acrylate | −56 |
| Hydroxy butyl acrylate | −45 |
| Butyl methacrylate | 22 |
| Ethyl acrylate | −22 |
| Ethyl hexyl acrylate | −70 |
| Ethyl methacrylate | 65 |
| Hydroxy propyl methacrylate | 76 |
| Lauryl methacrylate | −65 |
| Hydroxy ethyl methacrylate | 55 |

Other Tgs are disclosed in J. Brandrup et al (eds) Polymer Handbook 4th Ed. (2003) John Wiley & Sons and earlier editions.

Although the addition of high Tg monomers, as described above, increases the overall Tg of the polymer, the final Tg may still be lower than the process temperatures commonly used in crimping stents onto balloon catheters. This is problematic and can lead to, under extreme conditions, the formation of bridges between adjacent stent struts due to the polymer flowing. This problem is overcome in the present invention by the inclusion of monomer (iv) in the monomer mixture.

Monomer (iv) has functional groups which can react to form cross-links. Preferably the cross-linkable group is selected from cinnamyl, epoxy, —CHOHCH$_2$ Hal (in which Hal is a halogen atom), methylol, reactive silyl, an ethylenically unsaturated cross-linkable group or an aceto acetoxy or chloroalkyl sulphone.

Preferably monomer (IV) has the general formula (III)
in which $R^3$ is hydrogen or $C_{1-4}$ alkyl;
$A^2$ is —O— or —NR$^4$ where $R^4$ is hydrogen or a $C_{1-4}$ alkyl group;
$R^{3a}$ is a bond or $C_{1-24}$ alkanediyl group or alkyl-oxalkyl or alkyl-oligo oxalkyl group; and
$Q^2$ is a crosslinkable group.
In a particularly preferred embodiment, Q is a cross-linkable silyl group. Where Q is a cross-linkable silyl group, the monomer (IV) preferably has the general formula (IV)

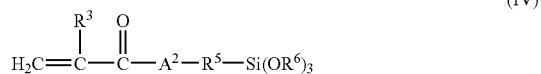

(IV)

In formula IV, $R^3$ is preferably selected from hydrogen and methyl groups, most preferably $R^3$ is methyl. $A^2$ is preferably —O—. $R^5$ is preferably $C_{2-6}$-alkylene, preferably $C_{2-4}$ alkylene. $R^6$ is selected from $C_{1-6}$ alkyl groups, preferably $C_{1-2}$ alkyl groups. Activation of the functional groups of monomer (V) results in inter- and intra-molecular cross-links being formed between adjacent molecules of polymer and therefore reduces the tendency to flow under applied stress. These functional groups may also be useful in increasing adhesion of the polymer to an implant e.g. a stent, particularly where an adhesion promoter is used.

The preferred polymers of the present invention are these falling within the poly ((2-methacryloyloxethyl)-2'-(trimethylammoniumethyl) phosphate, inner salt)-co-styrene-co-(methylmethacrylate)-co-(n-butyl acrylate)-co-(4-hydroxybutylacrylate)-co-(3-(trimethoxysilyl) propylmethacrylate) family. For polymers in this family, monomer (i) is a phosphorylcholine monomer, monomer (ii) is styrene, monomer (iii) comprises methyl methacrylate, butyl acrylate and hydroxybutyl acrylate and monomer (iv) comprises trimethoxysilylpropyl methacrylate.

According to a further aspect of the invention a composition comprises a polymer and another component. A composition may be a coating composition comprising a liquid vehicle. It may be a mixture of polymer and pharmaceutical active. It may be a mixture of polymers and primers. The other component may also include a diluent, excipient, filler or carrier.

The polymers of the present invention can be used as a coating for an implant. Implants or devices which may be coated have surfaces of plastics, metal ceramics and/or glass, etc. Preferably, the implant is formed of a material such as a polymer or a metal. Examples of metals include but are not limited to cobalt, chromium steel, magnesium, titanium, tantalum and further alloys or laminates thereof such as cobalt-chromium or cobalt-nickel-chromium.

In a preferred embodiment of the present invention, the implant is a stent. Preferably the stent is formed from stainless steel or from coextruded stainless steel-tantalum-stainless steel. It is preferred that the stent substrate is cleaned prior to application of the polymer for instance using solvent. In order to enhance adhesion of the polymer, the stent substrate may be plasma treated, preferably with oxygen, prior to application of the polymer.

In this regard, in the coating, the polymer may be bonded to the surface of the implant either directly or to a primer already coated on to the device. The primer may react with the polymer coating either by forming a covalent bond or in a different way. Where the primer interacts with the polymer coating, it may react with a functional group on the polymer which may be the same or different from the cross-linkable group of monomer (iv). Where a primer is used, preferably the primer is includes a compound selected from the group including compounds with a monoalkoxysilyl group, a dialkoxysilyl group, a trialkoxysilyl group and a chloro group. Such primers which are usually mixtures of compounds can be obtained commercially from companies such as Aldrich Chemicals and Nusil Technology Corp, for example.

In a preferred embodiment of the present invention, the primer includes pendant groups of the general formula (1X):
wherein Z is —OR$^{30}$ or Hal
$Z^1$ is —OR$^{30}$, Hal or alkyl
wherein $R^{30}$ is $C_{1-x}$alkyl or acyl and Hal is a halogen atom The primer may comprise a mixture of compounds such as silicate, a

(1)

zironate or titanate and an alkoxy silane. An example of a particularly preferred primer is SP120 available from Nusil. This silane primer comprises tetra-n-propyl silicate, tetrabutyltitanate and tetra (2-methoxyethoxy) silane. A further preferred primer is bis[3-(trimethoxysilyl)propyl]amine.

Where a primer is used, in one embodiment the primer is applied and allowed to dry on the surface of the device prior to application of the polymer according to the present invention. In an alternative embodiment, however, the polymer may be applied before a previously applied primer layer has been allowed to dry, or the polymer may be applied directly to the surface, for instance after cleaning and/or plasma treatment.

According to a further aspects of the invention a composition comprises the polymer and a primer compound which has a pendant group of general formula (X).

The invention is not limited with respect to the manner in which the polymer is applied. For example, the polymer may be applied to the implant by dipping or spraying a solution of the cross-linkable polymer in a suitable solvent, followed by drying and/or curing of the polymer by cross-linking it. In a preferred embodiment, the polymer is applied to the surface of the implant by spraying a solution onto the surface. Suitable liquid vehicles for coating compositions are solvents for the polymer, such as esters, alcohols, ethers, glycols or ketones, especially alcohols, such as $C_{2-6}$ alkanols, especially n- or i-propanol and ethanol, as well as mixutres, including mixtures with water or glycols. The method described in WO01/01957 which leads to thicker coatings on an external surface may be utilised.

Where the implant is ultimately intended to be a drug eluting implant, the pharmaceutical active and crosslinkable polymer may be applied together as a single layer from a mixed solution by a spray process followed by cross-linking of the polymer. Alternatively a coating of cross-linked copolymer may be loaded with drug e.g. from a solution in a solvent, for instance prior to packaging and sterilising, or after opening the storage package immediately prior to implantation. The loading level of active is controlled in part by the thickness of the polymer coating, the affinity of the active for the polymer, the loading conditions and the implant size. For a 15-18 mm long stent to be expanded to about approximately 3 mm to 3.5 mm in diameter, a target loading of polymer is likely to be in the range 100 to 1500 pg, for instance in the range 250 to 600 μg. The target drug loading will depend on the nature of the drug and its desired elution period and may be, for instance 50 to 1000 pg, preferably 100-500 μg. An implant which has a polymer/pharmaceutical active coating has a preferred weight ratio of polymer to drug in the range 40:60 to 90:10, preferably in the range 45:55 to 80:20. Where mixtures of actives are used these may be present in weight ratios in the range 1:100 to 100:1, for instance in the range 10:90 to 90:10, preferably in the range 20:80 to 80:20, more preferably in the range 40:60 to 60:40.

Examples of suitable pharmaceutical actives include antibiotics, antiangiogenic compounds, antirinthammabics, such as steroids or NSAIDS, e.g. cox inhibitors, glucocorticoids and cort costeroids, anti-platelet drugs, anti-coagulants, lipid regularly drugs, such as statins, cytotoxic drugs, such as antimetabolites, vinca alkaloids, other antineoplastics, matrix-metallo proteinase inhibitors, cyto toxic antibiotics. Specific examples include rapamycin and analogues thereof such as RAD001, tacrolimus, everolimus, Biolimus A9 and zotarolimus; tyrphostin; angiopeptin; carmustine; flavopiridol; gemcitabine and salts, tecans, such as camptothecin, topotecan and irinotecan, lomustine, methotrexate, mitomycin, taxanes, such as paclitaxel and docetaxel; actinomycin D, vincristine, vinblastine, streptozotocin, capecitabine, vinorelbine, doxorubicin and other anthracyclines, dexamethasone and derivatives thereof, in particular hydrophobic derivatives and dexamethasone phosphate, mometasone, triamcinolone, clobestasol, tetradecylselenoacetic acid, tetradecylthioacetic acid, ethylisopropylamiloride, antithrombin, aggrastat, aspirin, cilostazol, clexane, clopidogrel, dipyridamole, persantine, integrillin (eptifibatide), abciximabs, trapidil (rocornal), matrixmetalloproteinase inhibitors, such as batimastat and, marimastat; growth factors such as VEGF; gene therapy agents; statins such as avostatin, cerivastatin, flavastatin, lovastatin, rosuvastatin, simvastatin and sandostatin, carvedilol, estradiol and methoxyestradiol, L-arginine, nitric oxide donors, probucol, quinaprilat, thioctacid, telmisartan, zoledronate, and mixtures thereof. Also, agents such as antibodies and peptide sequences which encourage a natural healing process can be used e.g. growth factors.

In forming a coated implant according to the present invention, step the coating must be curved (cross-linked) prior to further processing steps such as assembly on to a balloon catheter for delivery in the case of a stent. Crosslinking may be achieved by any conventional method including application of heat and/or moisture, UV irradiation, gamma sterlisation, electron beam irradiation or autoclaving. This step causes the cross-linkable groups of monomer (iv) to cross link and prevents flow of the polymer in later processing step and may slow down elution of drug from a coating of the polymer.

During a sterilisation step the polymer may be further cross-linked, i.e. to provide a second step which is part of the total cross-linking of the polymer.

The present invention will now be described further with reference to the following figures and examples in which.

Figure 11:
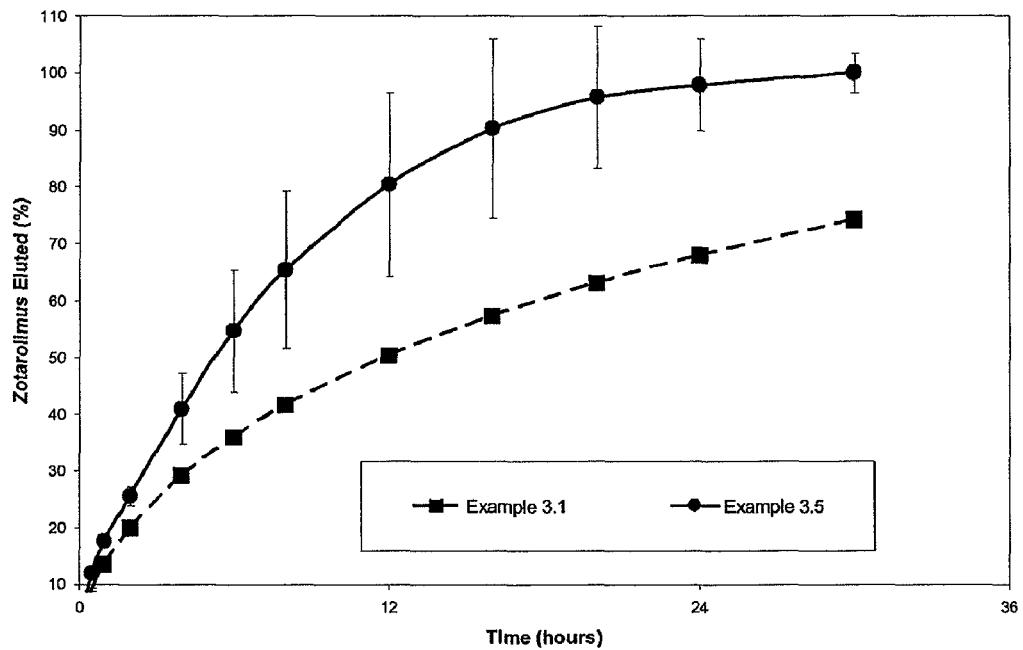
Figure 12:
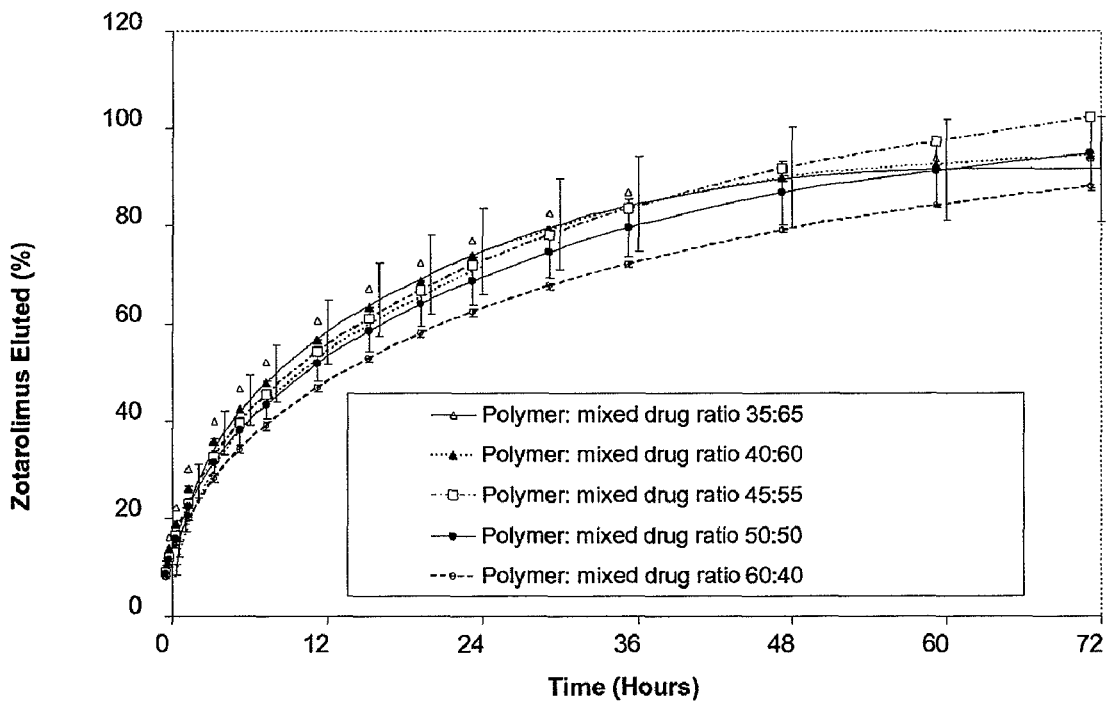
Figure 13:
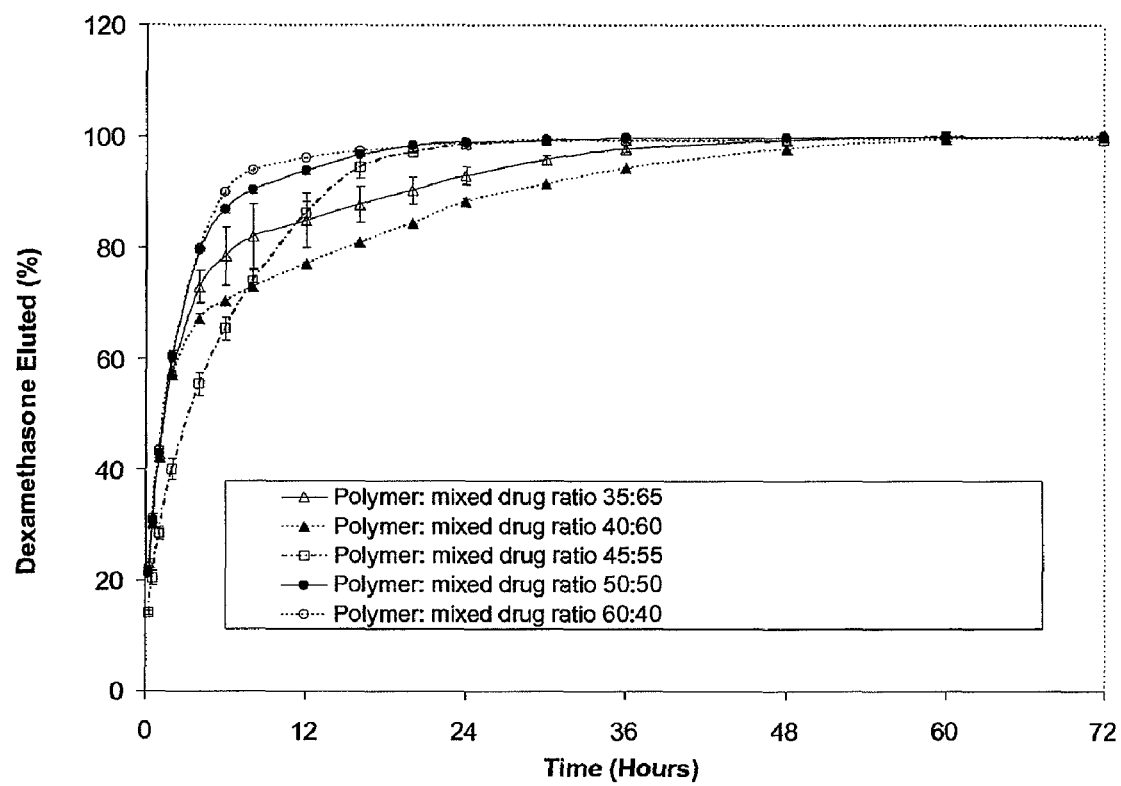

FIG. 11 shows the results of example 9; and FIGS. 12 and 13 show the results of example 10.

EXAMPLE 1

Synthesis of Polymers

The polymer is made by free radical co-polymerisation using monomer feed conditions throughout the reaction. An azo compound is used during the reaction for initiation and the reaction mixture is heated under reflux as a solution in isopropanol.

The polymer is purified by precipitation and diafiltration. The diafiltration unit is a Millipore ProFlux unit with a 0.1 m$^2$ regenerated cellulose membrane having a molecular weight cut-off of 10 KDa.

Polymerisation and Precipitation 100 g of isopropanol was charged to a suitable multi-necked flask fitted with mechanical stirrer, thermometer, condenser and feed inlet. The temperature was raised to reflux (83° C.) using a heated oil bath. In a suitable stoppered flask a solution of 10 g (10% wt) of PC monomer (2-methacryloy-loxyethyl-2'-(trimethylammonium)ethyl phosphate) in 100 g of isopropanol was prepared. 15 g (15% wt) of styrene, 15 g (15% wt) methyl methacrylate, 40 g (40% wt) butyl methacrylate, 15 g (15% wt) hydroxybutyl acrylate and 5 g (5% wt) of trimethoxysilyipropyl methacrylate were then added. In this monomer mixture the PC monomer is the hydrophilic monomer (i), styrene is monomer (ii), methyl methacrylate, butylacrylate and hydroxy butylacrylate are the mixture of monomers iii) and have a theoretical Tg of 17° C. and the silyl monomer is monomer iv) having the crosslinkable group.

A solution of 0.1 g of AIBN initiator in 3 g of isopropyl acetate was made. This initiator solution was added to the monomer solution using 3 g of isopropyl acetate as a rinse. The solution was well mixed and transferred to a 250 ml measuring cylinder using a further 5 g of isopropanol to rinse the flask.

When the reaction vessel solvent was refluxing the total monomer solution was pumped into the reaction flask over a period of 2 hours using a peristaltic pump.

The reaction mix was held at reflux for a further 75 minutes and then an initiator spike made up from 0.05 g of AIBN in 3 g of isopropyl acetate was added.

The reaction was held at reflux for a further 75 minutes and then a second spike made up from 0.05 g AIBN in 3 g isopropyl acetate was added.

The reaction was held at reflux for a further 150 minutes and then allowed to cool.

A 2 liter culture vessel fitted with mechanical stirrer and feed inlet was charged with the 500 ml of di-isopropyl ether. Using a suitable peristaltic pump, the polymer solution was pumped into this precipitation vessel with good but not vigorous stirring to avoid excessive splashing. As the precipitation proceeded, a further 1000 ml of di-isopropyl ether was added in four separate aliquots. When all the polymer solution had been added, the stirrer was turned off and the soft coagulated polymer mass allowed to settle. The supernatant solvents were decanted using a suction probe. 250 ml of di-isopropyl wash was added and stirred for 10 minutes. The stirrer was turned off and the supernatant solvent decanted. The wash was repeated with a further 250 ml of di-isopropyl ether and again as much of the supernatant as possible was decanted.

150 g of ethanol was added and after freeing the stirrer by hand the mixture was stirred until a clear solution was obtained. Gentle warming with an external warm water bath helped the dissolution. The polymer solution was transferred to a suitable tared bottle and a sample taken for non-volatile content (110° C. for 30 minutes) to determine conversion.

Diafiltration:

The Pellicon mini cassette and membrane was assembled and the whole ProFlux unit was flushed with about 300 ml of ethanol. The pump was started and the conditions adjusted to ensure that the membrane was well wetted and a significant amount of permeate was obtained. The system was drained. The polymer solution obtained was diluted with a further 150 g of ethanol and the solution was charged to the ProFlux reservoir. The pump was started and the conditions adjusted so that permeate was obtained at the rate of about 100 ml every 15-20 minutes. The diafiltration was continued until 200 ml of permeate had been collected. A further 1200 ml of ethanol was added to the ProFlux reservoir and the diafiltration was continued until 1200 ml of ethanol permeate had been collected.

The diafiltration was continued until an extra 150 ml of permeate had been collected and then the polymer solution was drained into a tared bottle. A sample of the final polymer solution was taken for non-volatile content and residual monomer and solvent composition analysis.

EXAMPLE 2

The general process of example 1 was followed but using the formulation:

| | |
|---|---|
| Isopropanol | 48 g |
| Isopropyl acetate | 12 g |
| PC monomer | 7.5 g |
| Isopropanol | 48 g |
| Methyl methacrylate | 7.5 g |
| Butyl acrylate | 17.5 g |
| Styrene | 7.5 g |
| Hydroxypropyl methacrylate | 7.5 g |
| Trimethoxypropylsilyl methacrylate | 2.5 g |
| Azobismethylpropionitrile (AIBN) | 0.06 g |
| Isopropyl acetate | 5.0 g |

-continued

| | |
|---|---|
| Isopropyl acetate wash | 5.0 g |
| AIBN | 0.02 g |
| Isopropyl acetate | 5.0 g |

The polymerisation was carried out as described in example 1 and the resulting polymer solution precipitated in di-isopropyl ether (2 liters in all). The sticky precipitate was then dissolved in ethanol and the solids content adjusted to 20%. The solution was used without further purification by diafiltration. In this example the mixture of monomers iii) has a theoretical Tg of −7° C.

EXAMPLE 3

The process of Example 2 was followed with the following monomer compositions:

| | Polymer | | | | | | |
|---|---|---|---|---|---|---|---|
| MONOMER (Wt %) | 3.1 | 3.2 | 3.3 | 3.4 | 3.5 | 3.6 | 3.7 |
| PC Monomer | 10 | 10 | 15 | 10 | 15 | 15 | 29 |
| Styrene | 15 | 15 | 16 | 15 | 15 | — | — |
| Methyl Methacrylate | 20 | 20 | 16 | — | 15 | 15 | — |
| Lauryl Methacrylate | — | 35 | 33 | — | — | — | 51 |
| Butyl Methacrylate | — | — | — | 55 | — | 20 | — |
| Butyl Acrylate | 35 | — | — | — | 35 | 30 | — |
| Hydroxypropyl Methacrylate | — | — | 15 | — | — | — | 15 |
| Hydroxybutyl Acrylate | 15 | 15 | — | 15 | 15 | 15 | — |
| Trimethoxysilylpropyl Methacrylate | 5 | 5 | 5 | 5 | 5 | 5 | 5 |
| Tg of monomer mix iii) ° C. | −23 | −30 | −11 | 4 | −33 | −17 | −44 |

All polymers were precipitated in DIPE and then used without further purification. The polymer of Example 3.1 has a measured Tg of 45° C.

REFERENCE EXAMPLE 3.7

A polymer is formed of the phosphorylcholine monomer (29 parts by weight), lauryl methacrylate (51 parts), hydroxypropylmethacrylate (15 parts) and trimethoxylsilylpropyl methacrylate (5 parts) by the method described in detail in WO 9830615. It is then subjected to comparative testing. The monomer mix iii) has a calculated Tg of −44° C., but the polymer contains no styrene.

EXAMPLE 4

100 g of 1-butanol was placed in a suitable multi-necked flask fitted with mechanical stirrer, thermometer, condenser and feed inlet. The temperature was raised to reflux (118° C.) using a heated oilbath.

11 g of PC monomer was placed in a suitable stoppered flask and dissolved in 100 g of butanol.

20 g of styrene monomer was added followed by 20 g of methyl methacrylate, 29 g of butyl acrylate, 14 g of hydroxybutyl acrylate and 6 g of trimethoxypropylsilyl methacrylate. The theoretical Tg of the monomer iii) mix is −19° C.

2.0 g of a 5% solution of Luperox 331M80 (Atofina Chemicals Inc.) in butanol was also added and the solution mixed well.

The monomer solution was pumped to the refluxing butanol over a period of about 2 hours and then held at reflux for a further 75 minutes. An initiator spike of 1 g of the 5% solution of Luperox was then added and the reaction mix held at reflux for a further 2 hours.

After this time the polymer solution was cooled and diluted with 300 g of ethanol.

The diluted solution was then subjected to diafiltration through a regenerated cellulose membrane having a molecular weight cut off of 10 kDa using a further 1500 ml of ethanol. The solution was finally concentrated to about 400 ml and decanted and the non-volatile content determined gravimetrically by evaporation of solvents at 100° C. The solution concentration was then adjusted to 20% by addition of a calculated amount of ethanol.

EXAMPLE 5

Effect of Crosslinking

The polymers produced as described in Examples 1 to 4 were applied to a stainless steel stent. Polymers of the invention were applied to the stents by spraying a solution of the polymer and drug in a suitable solvent. The equipment used consisted of a spray gun, an accurate dispensing pump to deliver the solution to the gun, and a motion system to simultaneously rotate and traverse the stent through the spray.

The stents were first prepared for receiving the polymer/drug coating. This preparation could include cleaning, surface activation, or application of an adhesion promoter. The stents were then sprayed by attaching them to a suitable holder, mounting the stent/holder on the motion system and passing the stent through the spray. The thickness of the polymer/drug coating could be controlled by adjusting the traverse speed of the stent through the spray or by performing multiple passes of the stent through the spray.

The results of these experiments were observed using the polymer detailed in Example 3.1 by SEM of the stents after balloon expansion. The results showed that where the coating has not been cross-linked, the polymer coatings on adjacent struts tend to adhere to each other. This results in defects in the stent once the stent is expanded. In contrast, where the coating has been cross-linked, polymer flow during crimping is minimised and the stent is relatively defect free after stent expansion.

EXAMPLE 6

Adhesion to a Stainless Steel

Testing has shown that the presence of a silane primer improves the adhesion of the polymer of the type exemplified, specifically Example 3.1 to stainless steel surfaces. This testing involved two types of experiment. The first of these involved an assessment of the adhesion of the coating to stainless steel sheet. The second test involved placing strips of stainless steel sheet coated in the polymers of the type exemplified in Example 3.1 into saline or ethanol. The swelling behaviour of the coating was then evaluated over time. For each experiment two types of silane primer were used. The first was SP120 which is commercially available from Nusil Corporation, USA and the second silane used was based on bis[3-(trimethoxysilyl)-propyl]amine. The details of the sample preparation, test methods used and results are now described.

Sample Preparation:

A sample of stainless steel (316L) was cut into small square sections. The surface of the stainless steel samples were then treated using either solvent cleaning, $O_2$ plasma treatment or both solvent cleaning and $O_2$ plasma treatment combined. Some samples were then coated in an adhesion promoter. The polymer of example 3.1 was then added to the surface of each treated stainless steel sample and allowed to dry. Once dry the polymer was cross-linked. For this experiment further details for each step is provided below.

Primer Solution Preparation: SP120

9.5 ml of ethanol were mixed with 0.5 ml of SP120 silane primer (Nusil Corporation, USA). 5 ml of this diluted SP120 solution was added to 45 ml of ethanol.

Primer Solution Preparation: Bis [3-(trimethoxysilyl)-propyl]amine 9 ml of ethanol were mixed with 0.5 ml of HPLC grade water. To this solution 0.5 ml of Bis [3-(trimethoxysilyl)-propyl]amine was added. 5 ml of this diluted solution was added to 45 ml ethanol.

Surface Solvent Cleaning:

The surface solvent cleaning process used to clean the surface of the stainless steel strips was a five step cleaning process.

The steel coupons to be cleaned were first submerged in a beaker of fresh ultra-pure water (Romil). The beaker was then sonicated for 2 minutes. The water and coupons were then poured into a sieve and the liquid drained. This process was then repeated using ethanol (Absolute, Romil). The procedure was repeated a further two times using dichloromethane (Romil) before the process is repeated a final time using ethanol (Romil) again. The coupons were finally placed in a clean beaker and placed in an oven at 60-70° C. until completely dry $O_2$ Plasma Treatment:

The coupons to be treated were placed on the shelf of the plasma etcher and then plasma treated for 300 seconds using $O_2$ plasma. The gas flow rate was set at 2-3 liters per minute and the plasma chamber was set to 200 watts.

The coupons were removed from the chamber using tweezers and used for the next stage within 30 minutes.

Application of the Primer:

Using a pipette, 50 µl of the primer solution was applied to one side of the coupon (making sure where applicable that this is the plasma treated side). Using tweezers, the coupon was manipulated to ensure full coverage with the primer. The primer was then allowed to dry at ambient temperature for approximately 5 minutes before the polymer was added Polymer Coating Using a pipette, 100 µl of polymer solution (200 mg/ml of polymer from Example 3.1 or polymer exemplified in WO9830615 in ethanol) was slowly applied to each coupon. The pipette was manipulated so that a square of approx 15 mm×15 mm of polymer was coated onto the centre of the coupon.

The polymer was then cross-linked for 4 hours at 70° C. in the presence of moisture. The presence of moisture during cross-linking is maintained by placing a beaker containing 400 ml of water in the oven with the samples.

Figure 1:
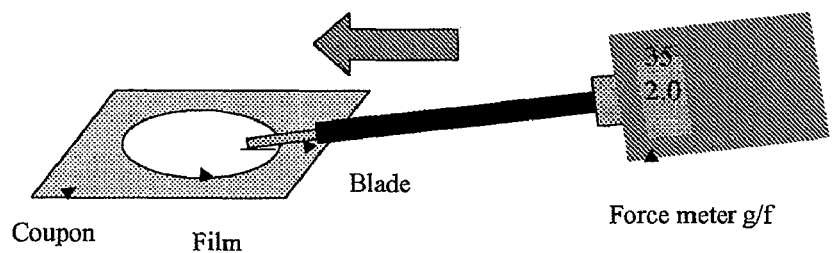
FIG. 1 is a schematic of the adhesion testing of the polymer as described in Example 6.

Adhesion Testing:

The samples were first allowed to hydrate in saline (0.9 wt % NaCl) at room temperature for a minimum of 30 minutes prior to testing. Once hydrated the adhesion of the film to the stainless steel surface was tested. This was performed by measuring the force required to remove the coating from the steel surface. A force gauge with a modified 3 mm tip was used to measure the adhesion of the polymer to the stainless steel coupon. The coupon was placed onto a microscope stage. The tip of the stem of the force gauge was brought into contact with the edge of the polymer film at an angle of approximately 30°. The force gauge was set in compression mode and maximum peak mode and set to zero. The gauge was pushed forward until the film delaminated from the surface (FIG. 1). The peak force registered on the display was taken as the force required to remove the film from the stainless steel.

Figure 2:
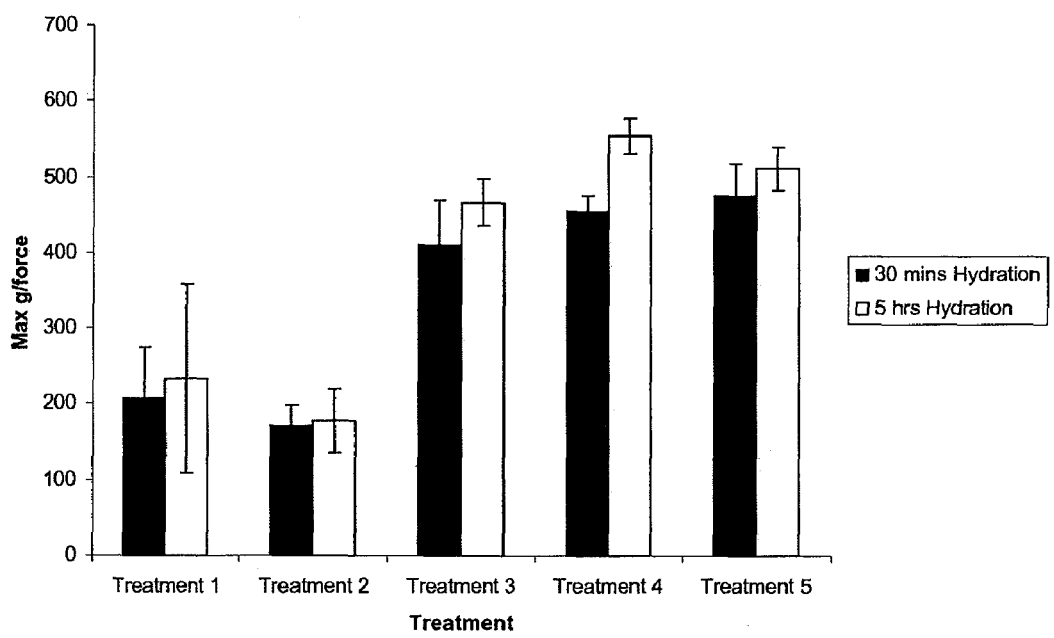
FIGS. 2 and 3 show the results of the adhesion testing described in Example 6.
Figure 3:
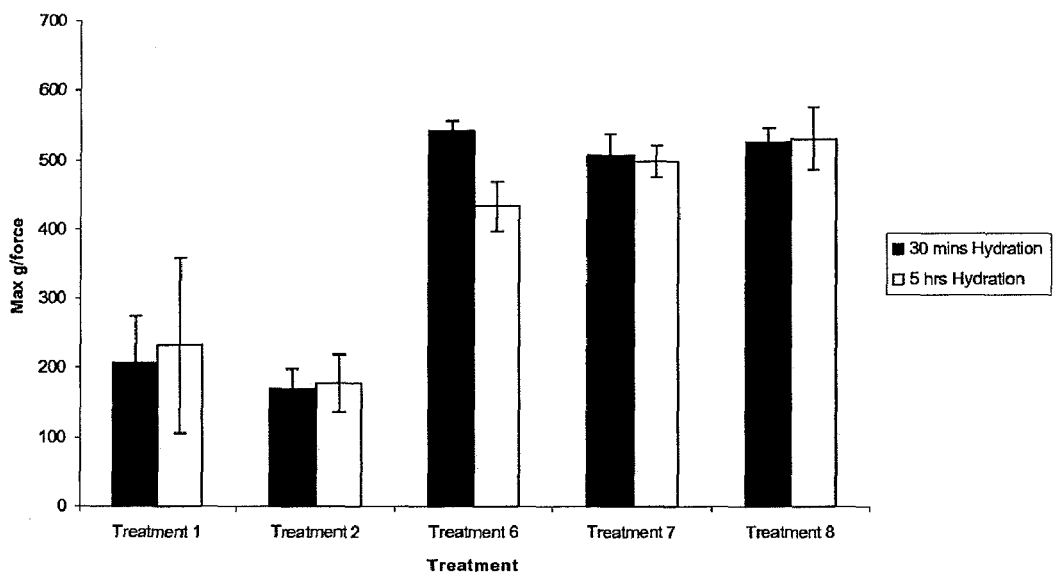

The test was repeated at two different hydration times (30 mins and 5 hours) and no significant differences were observed in the resulting adhesion test results between these two time points. Table C shows the different treatments studied and FIGS. 2 and 3 the results obtained for the SP120 silane and Bis [3-(trimethoxysilyl)-propyl]amine primer respectively.

TABLE C

The different treatments applied to the stainless steel coupons prior to coating with polymer from example 3.1.

| Treatment | Surface Solvent Cleaned | O₂ Plasma Treated | SP120 Primer | Bis [3-(trimethoxysilyl)-propyl]amine Primer |
|---|---|---|---|---|
| Treatment 1 | — | ✓ | — | — |
| Treatment 2 | ✓ | ✓ | — | — |
| Treatment 3 | — | ✓ | ✓ | — |
| Treatment 4 | ✓ | — | ✓ | — |
| Treatment 5 | ✓ | ✓ | ✓ | — |
| Treatment 6 | — | ✓ | — | ✓ |
| Treatment 7 | ✓ | — | — | ✓ |
| Treatment 8 | ✓ | ✓ | — | ✓ |

It can be seen from the data (FIGS. 2 and 3) that samples in which the stainless steel was simply cleaned as described generally gave lower adhesion values than for samples in which the surface had additionally been treated with the silane primer. This clearly shows that the presence of the primer increases the adhesion of the polymer coating to the surface of the stainless steel. In their hydrated state the polymer coatings were very tough and robust when handled and the steel sheets could be bent through 180° without the coating cracking or delaminating. Similar behaviours were also observed for the Reference Example 3.7 as these could also be bent with ease once hydrated through 180° without the coating showing signs of failure.

sidered that this would be a suitable solvent to 'force swell' the coating from the stainless steel and if the coating could not be removed by swelling in ethanol, then it would be concluded that it has a strong adhesive bond to the stainless steel surface.

The different treatments applied to the stainless steel coupons prior to coating with the polymer from Example 3.1 are provided in Table N. Test samples of stainless steel strips coated in the polymer exemplified in example 3.1 were prepared as described previously (see previous section).

As described earlier, once dry the coating was cross-linked at 70° C. for 4 hours in the presence of moisture. The samples were then immersed in ethanol and the appearance of the coating evaluated over time. The data (see Table O) clearly show that the coating remains attached to the stainless steel surface in the form of an intact polymer film when the surface has been treated with a silane primer. Without a silane primer, the coating tends to swell from the surface and can sometimes have a tendency to delaminate from the surface of the stainless steel. Generally however, the coating exemplified in example 3.1 remains intact and bonded to the surface of the stainless steel, no matter what stainless steel pre-treatment method is used. This provides support for the fact that even without silane coupling agents the polymers of the type exemplified, and the polymer from example 3.1 in particular, have been optimally designed to bond strongly to stainless steel when cross-linked as described.

TABLE N

The different treatments applied to the stainless steel coupons prior to coating with polymer from Example 3.1.

| Treatment | Surface Solvent Cleaned | O₂ Plasma Treated | SP120 Primer | Bis [3-(trimethoxysilyl)-propyl]amine Primer |
|---|---|---|---|---|
| Treatment A | ✓ | — | — | — |
| Treatment B | ✓ | ✓ | — | — |
| Treatment C | ✓ | ✓ | ✓ | — |
| Treatment D | ✓ | ✓ | — | ✓ |

TABLE O

The results of swelling the polymer of example 3.1 coatings on stainless steel in ethanol at different time points.

| Treatment | Observations after 5 minutes | Observations after 15 minutes | Observations after 30 minutes | Observations after 60 minutes |
|---|---|---|---|---|
| Treatment A | Frosted surface of coating | Coating very swollen but still bonded | Coating very swollen but still bonded | Coating very swollen but still bonded |
| Treatment B | Frosted surface of coating | Coating very swollen but still bonded | Coating very swollen but still bonded | Coating very swollen but still bonded |
| Treatment C | Frosted surface of coating | Good quality tightly bound coating | Good quality tightly bound coating | Good quality tightly bound coating |
| Treatment D | Frosted surface of coating | Good quality tightly bound coating | Good quality tightly bound coating | Good quality tightly bound coating |

Forced Swelling Tests:

The second test used to evaluate the adhesion of the polymer exemplified in Example 3.1 to stainless steel involved forced swelling of the coating. Prior to cross-linking, the polymer is readily soluble in ethanol. Therefore it was con- Aqueous Swelling Tests:

A further test used to evaluate the adhesion of the polymers exemplified in Example 3.1 and Example 3.7 to stainless steel involved the swelling of the coating in Isoton solution.

The different treatments applied to the stainless steel coupons prior to coating with the polymer from Example 3.1 and Reference Example 3.7 (see below) are provided in Table P. Test samples of stainless steel strips coated in the polymer exemplified in example 3.1 and Reference Example 3.7 were prepared as described previously (see previous section).

As described earlier, once dry the coating was cross-linked at 70° C. for 4 hours in the presence of moisture. The samples were then immersed in Isoton solution and the appearance of the coating evaluated at different timepoints. At each time interval a sharp edge was used to try to prise the coating away from the surface of the stainless steel. A subjective assessment of the adhesion was made at each time point. The results are shown in Tables Q and U.

TABLE P

The different treatments applied to the stainless steel coupons prior to coating with polymer.

| Treatment | Surface Solvent Cleaned | O₂ Plasma Treated | SP120 Primer | Bis [3-(trimethoxysilyl)-propyl]amine Primer |
|---|---|---|---|---|
| Treatment AA | ✓ | — | — | — |
| Treatment BB | ✓ | ✓ | — | — |
| Treatment CC | ✓ | ✓ | ✓ | — |
| Treatment DD | ✓ | ✓ | — | ✓ |
| Treatment EE | ✓ | ✓ | ✓ | — |
| Treatment FF | ✓ | ✓ | — | ✓ |

TABLE Q

Visual assessment of the adhesion of the Polymer from Example 3.1 to stainless steel coupons after incubation in Isoton over 24 hrs.

| Treatment | Solvent cleaned | Oxygen plasma treatment | Silane treatment | Incubation in Isoton 25° C. for 24 hrs |
|---|---|---|---|---|
| Treatment AA | ✓ | x | x | Good adhesion but the film could be removed using a sharp edge |
| Treatment BB | ✓ | ✓ | x | Film fully delaminated |
| Treatment CC | ✓ | x | SP120 | Well adhered film |
| Treatment DD | ✓ | x | Bis[3(trimethoxysilyl)-propyl] amine | Well adhered film |
| Treatment EE | ✓ | ✓ | SP120 | Well adhered film |
| Treatment FF | ✓ | ✓ | Bis[3(trimethoxysilyl)-propyl] amine | Well adhered film |

TABLE U

Visual assessment of the adhesion of the Polymer from Example 3.7 to stainless steel coupons after incubation in Isoton over 24 hrs.

| Treatment | Solvent cleaned | Oxygen plasma treatment | Silane treatment | Incubation in Isoton 25° C. for 24 hrs |
|---|---|---|---|---|
| Treatment AA | ✓ | x | x | Poor film adhesion. Film swollen from surface. |
| Treatment BB | ✓ | ✓ | x | Poor film adhesion. Film swollen from surface. |
| Treatment CC | ✓ | x | SP120 | Well adhered film |
| Treatment DD | ✓ | x | Bis[3(tri-methoxysilyl)-propyl] amine | Well adhered film |
| Treatment EE | ✓ | ✓ | SP120 | Well adhered film |
| Treatment FF | ✓ | ✓ | Bis[3(tri-methoxysilyl)-propyl] amine | Well adhered film |

The data (see Tables Q and U) clearly show that the coating remains attached to the stainless steel surface when placed in Isoton solution when the surface has been treated with a silane primer. In the case of the polymer exemplified in 3.1, it is difficult to remove the polymer film from the stainless steel with a sharp edge since the bonding is very strong. It was observed that for this polymer system, for example, there was also good adhesion even when primers were not used and the surface had been only solvent cleaned prior to coating with the polymer and cross-linking. The primer did however improve the adhesion of this polymer to the surface of stainless steel when compared to samples which had been only cleaned and/or plasma treated prior to coating with the polymer.

EXAMPLE 7

Effect of Water Content of the Polymer

The water content of the polymer films was measured according to the method detailed below.

The first step in the testing method is to cast a polymer film. PC polymer films were cast onto a sacrificial gelatine layer as it was not possible to remove the films from solid surfaces once dry.

The films were cast in 150 mm diameter glass petri dishes. The gelatine solution was prepared by dissolving 10 g of powdered gelatine in 100 ml of boiling water. Once dissolved, the gelatine solution was poured into the petri dishes. Enough solution was added to cover the surface of the dish. The dish was also tilted so that the gelatine coated the walls of the dish. The gelatine was then allowed to set and dry.

The polymer solution was prepared at a concentration of 200 mg/ml in ethanol. For a 150 mm diameter petri dish, 25 ml of solution was used; this produced a film approximately 0.35 mm thick. The polymer solution was poured onto the gelatine and allowed to dry at room temperature. Once dry, the films were cross-linked at 70° C. for 4 hours in the presence of moisture.

After cross-linking, the films were allowed to return to room temperature slowly, before being hydrated. This step was found to be important, as when the films were wetted while still being hot, the polymer film cracked. The films were hydrated using saline (0.9 wt % NaCl). After approximately 1 hour the gelatine had softened enough for the polymer film to be removed from the collective layer easily. The films were then kept in a hydrated state before testing.

The water content was measured by gravimetry. This was performed by taking fully hydrated samples of the resulting film at room temperature and measuring the difference in weight between when the films are dry and when they are hydrated. The same method as that used in Example 8 was used here to prepare and test the modulus and maximum stress.

Figure 4:
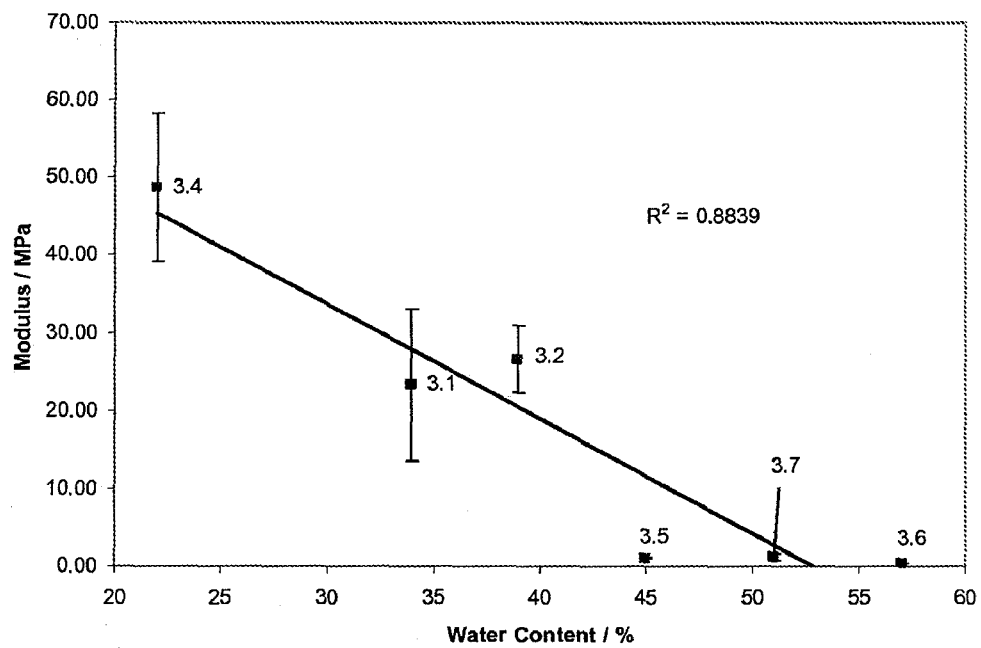
FIG. 4 illustrates the water content versus the modulus for a family of polymers falling within the scope of the present invention.
Figure 5:
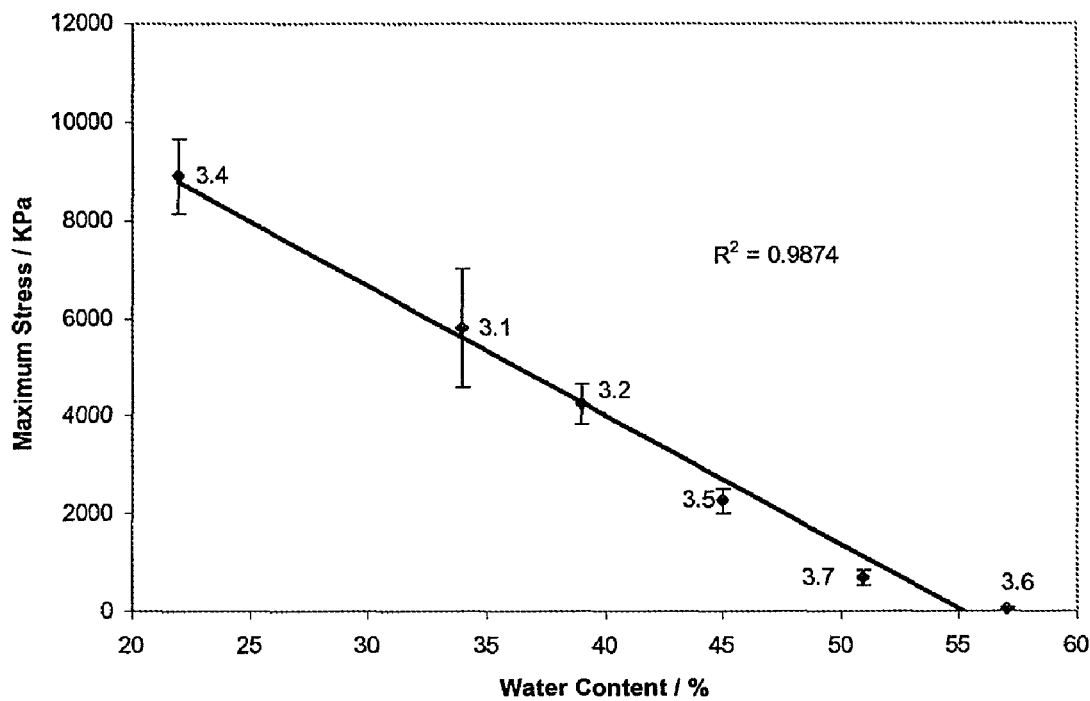
FIG. 5 illustrates the water content versus the maximum stress for a preferred family of polymers.
Figure 6:
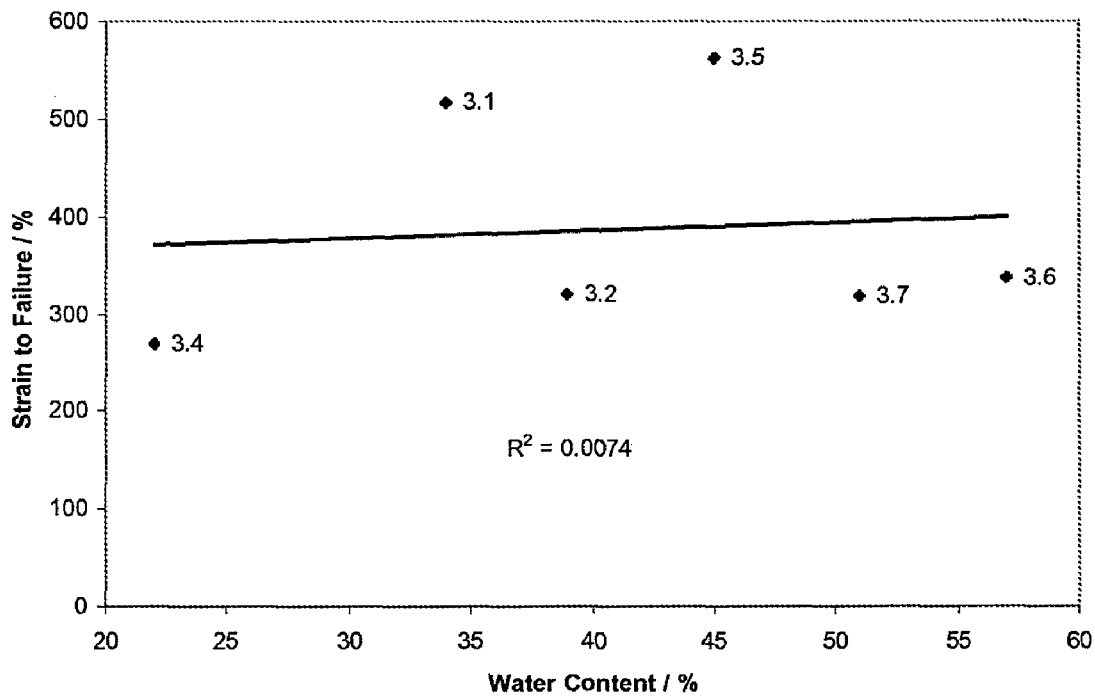
FIG. 6 shows the water content versus the strain to failure for a preferred family of polymers;.

The effect of the water content on the mechanical properties of polymer films at a given temperature has been studied. It can be seen that there are strong correlations between the water content and modulus and water content and maximum stress (see FIGS. 4 and 5). The graphs show both the Young's modulus (FIG. 4) and maximum stress (FIG. 5) were inversely proportional to the water content. The graph showing strain to failure (FIG. 6) showed no relationship between water content and strain to failure. Also the incorporation of styrene improved the modulus.

Figure 7:
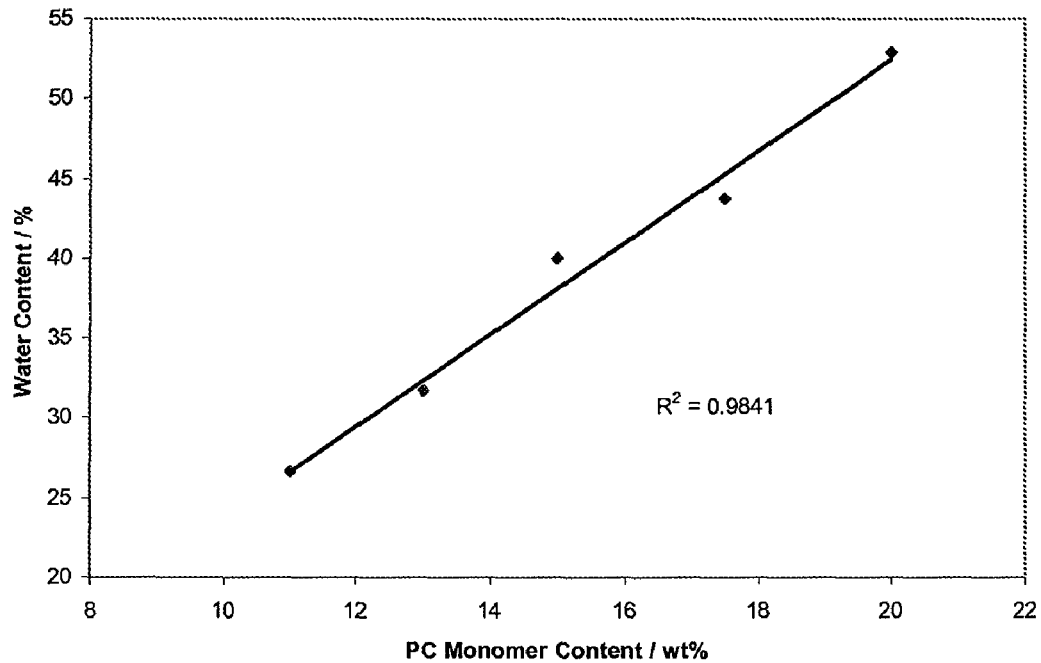
FIG. 7 shows the water content versus the content of monomer (i) for a preferred family of polymers.

These data show that the water content had a significant affect on the mechanical properties of the polymers, and therefore the performance of the polymers on the stents. Therefore by changing the amount of hydrophilic high Tg monomer (i) incorporated into the polymer, the modulus and therefore the strength of the coating in its hydrated state can be controlled somewhat. The relationship between water content and the PC monomer content for a family of polymers is shown in FIG. 7.

Figure 8:
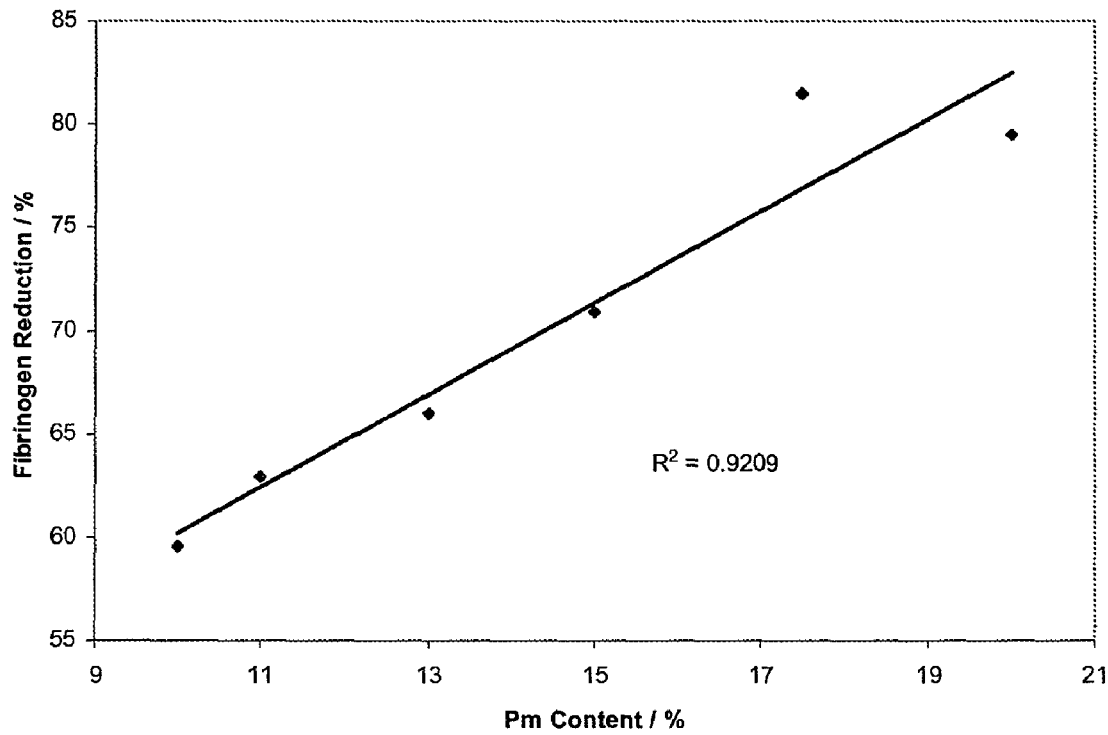
FIG. 8 shows the fibrinogen binding reduction as a measure of the content of monomer (i) for a preferred family of polymers.

The addition of further high Tg monomer(i), specifically in this case PC monomer also increases the biocompatibility of the polymer film. By increasing the amount of PC monomer added it is possible to control the biocompatibility of the polymer coating. One way of assessing the biocompatibility of a coating is to measure the amount of Fibrinogen it takes up compared to control samples. A range of polymers were produced with the same monomers as the polymer which is exemplified in this Example 3.1, but with an increasing ratio of PC monomer. PC monomer was added to the monomer reaction mixtures from 10 to 20 wt % and the other monomers in the formulations were adjusted slightly in each case to account for the increased PC monomer. These polymers were tested for their equilibrium water content and their fibrinogen adsorbance reduction (measured as in WO9301221) compared to PET sheet. These results are shown below in FIGS. 7 and 8 respectively.

It has surprisingly been found that good biocompatibility is observed even at relatively low amounts of monomer (i) PC monomer contents despite the incorporation of significant levels of hydrophobic monomers (particularly styrene) and the reductions involved are of a similar order to the reductions observed for the Reference Example 3.7.

EXAMPLE 8

Flexibility

As the stent is expanded in vivo, the stent coating needs to be designed to be flexible in the in vivo environment. Samples were therefore tested at both room temperature and 37° C. (i.e. body temperature). The samples were tested according to the following methodology.

The first step in the testing method is to cast a polymer film. PC polymer films were cast onto a sacrificial gelatine layer as it was not possible to remove the films from solid surfaces once dry.

The films were cast in 150 mm diameter glass petri dishes. The gelatine solution was prepared by dissolving 10 g of powdered gelatine in 100 ml of boiling water. Once dissolved, the gelatine solution was poured into the petri dishes. Enough solution was added to cover the surface of the dish. The dish was also tilted so that the gelatine coated the walls of the dish. The gelatine was then allowed to set and dry.

The polymer solution was prepared at a concentration of 200 mg/ml in ethanol. For a 150 mm diameter petri dish, 25 ml of solution was used; this produced a film approximately 0.35 mm thick. The polymer solution was poured onto the gelatine and allowed to dry at room temperature. Once dry, the films were cross-linked at 70° C. for 4 hours in the presence of moisture.

After cross-linking, the films were allowed to return to room temperature slowly, before being hydrated. This step was found to be important, as when the films were wetted while still being hot, the polymer film cracked. The films were hydrated using saline (0.9 wt % NaCl). After approximately 1 hour the gelatine had softened enough for the polymer film to be removed from the collective layer easily. The films were then kept in a hydrated state before testing.

Figure 10:
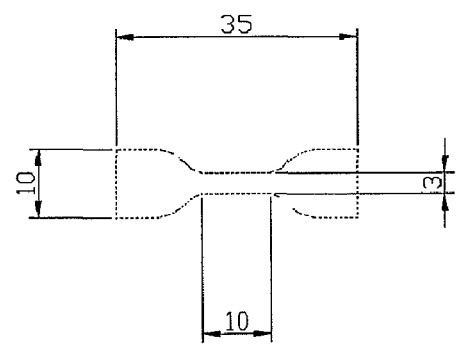
FIG. 10 shows the shape of a tensile test sample.

Tensile test coupons were then produced using a custom-made dumbbell cutter. The dimensions (in mm) of the coupon are shown below in FIG. 10. The test specimens were cut from the polymer film by firmly pressing the cutter into the hydrated film until a piece of the film was removed in the shape of a dumbell. The tests specimen were visually inspected to ensure that there were no surface imperfections. Samples with visible imperfections were not tested.

Tensile testing was performed using an Instron 4411 (or equivalent equipment). The following parameters were used during all the tests;

Flat faced pneumatic grips.
Grip separation—20 mm.
Load Cell—50N
Cross-head Speed—100 mm min-1

Since the modulus is sensitive to temperature, it is important that the temperature is controlled during testing. This can be accomplished by maintaining the saline used to hydrate the film during tensile testing at the desired temperature.

Figure 9:
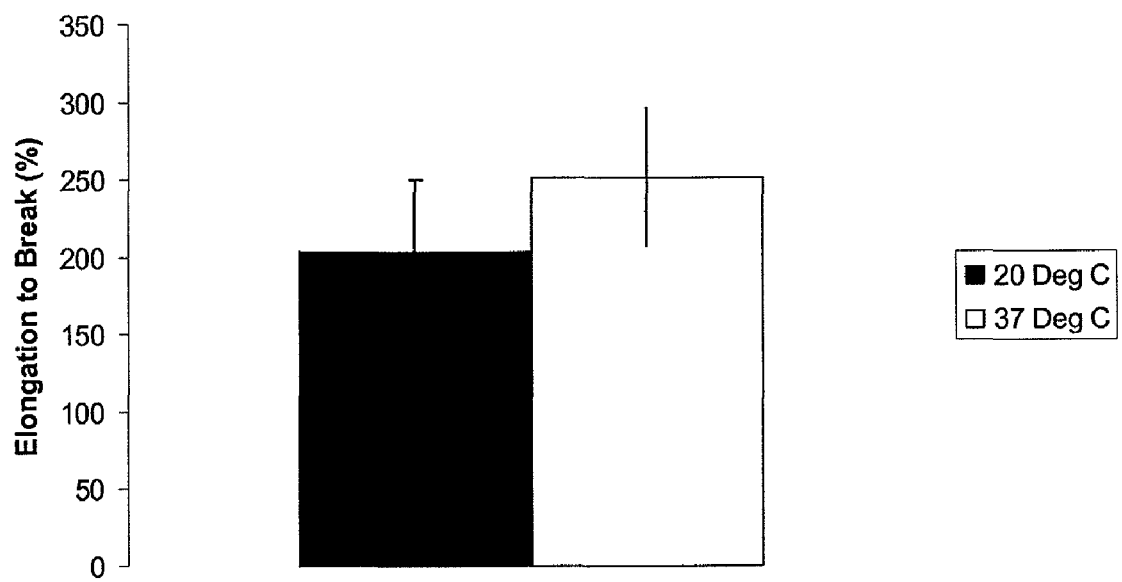
FIG. 9 shows the elongation at break for a polymer falling within the scope of the present invention tested in the hydrated state at room temperature and 37° C.

FIG. 9 shows the results obtained for the elongation to break of a sample of polymer from example 3.1 at both room temperature and at 37° C. It can be seen that the elongation to break is increased as the temperature is raised. This is because the higher temperature is approaching the Tg of the polymer in its dry state and is effectively above the Tg of the hydrated and therefore plasticized polymer. This results in a significant increase in molecular flexibility of the polymer film or coating. This increase in molecular flexibility allows the polymer molecules to stretch to a greater extent under a given applied stress and thus increases the strain to break.

For comparison, the modulus and water content of the polymer from the Reference Example 3.7 was measured in a similar fashion. The membrane of the polymer was cast and cross-linked as described above for this Example, and the modulus was also tested as described for this Example.

The modulus (hydrated) at room temperature is 1.25 MPa, while the modulus (hydrated) at 37° C. was found to be 0.27 MPa. The equilibrium water content was 50% and the elongation at break was more than 200%. It can be seen that the hydrated room temperature modulus of the novel polymer is far higher.

EXAMPLE 9

Drug Elution from Coated Stents

Polymers as described in Examples 3.1 and 3.5 were combined with a pharmaceutical active, in this example the antiproliferative agent zotarolimus, in the drug to polymer ratio 40:60. These polymer drug combinations were applied using a spray coating technique (as in example 6) to oxygen plasma and silane-treated (as in example 6 using SP120) stainless steel stents. The coated stents were cured at 70° C. for 4 hrs followed by ethylene oxide sterilisation.

The coated stents were placed in 1% Solutol™ at 37° C. Aliquots of the elution media were taken at predetermined intervals between zero and 72 hrs. The concentration of pharmaceutical active in the aliquots of elution media were analysed using standard HPLC techniques. The levels of pharmaceutical active measured were plotted against the time points. Figure II shows the cumulative total elution of zotarolimus in 1% Solutol at 37° C. from coronary stents coated with Example 3.1 and 3.5 in the pharmaceutical active to polymer ratio of 40:60.

EXAMPLE 10

Dual Elution of Drugs from Coated Stents

The polymer of Example 3.1 was combined with pharmaceutical actives, in this case zotarolimus and dexamethasone (50:50 weight ratio), in the total drugs to polymer weight ratios of 65:35, 60:40, 55:45, 50:50 and 40:60. These polymer-drug combinations were applied using a spray coating technique to oxygen plasma and silane-treated stainless steel stents (using the techniques of example 6 and SP120 silane primer). The coated stents were cured at 70° C. for 4 hrs followed by ethylene oxide sterilisation.

The coated stents were placed in 1% Solutol™ at 37° C. Aliquots of the elution media were taken at predetermined intervals between zero and 72 hrs. The concentration of the pharmaceutical actives (zotarolimus and dexamethasone) in the aliquots of elution media were analysed using standard HPLC techniques. The levels of pharmaceutical active measured were plotted against the time points as shown in FIG. 12 which shows the coated stents were placed in 1% Solutol™ at 37° C. Aliquots of the elution media were taken at predetermined intervals between zero and 72 hrs. The concentration of the pharmaceutical actives (zotarolimus and dexamethasone) in the aliquots of elution media were analysed using standard HPLC techniques. The levels of pharmaceutical active measured were plotted against the time points as shown in FIG. 12 which shows The cumulative total elution of zotarolimus in 1% Solutol at 37° C. from coronary stents coated with Example 3.1 in the mixed drug to polymer ratios of 65:35, 60:40, 55:45, 50:50 and 40:60. FIG. 13 which shows the cumulative total elution of dexamethasone in 1% Solutol at 37° C. from coronary stents coated with Example 3.1 in the mixed drug to polymer ratios of 65:35, 60:40, 55:45, 50:50 and 40:60.

The invention claimed is:

1. A polymer obtained by copolymerizing a monomer mixture comprising
    (i) 5 to 40wt % of a hydrophilic monomer of the general formula (I)

wherein B is a straight or branched alkylene, oxaalkylene or oligo-oxaalkylene chain optionally containing one or more fluorine atoms up to and including perfluorinated chains or, if X contains a carbon-carbon chain between B and the centre of permanent positive charge or if Y contains a terminal carbon atom bonded to B, a valence bond;
    X is a zwitterionic group and
    Y is an ethylenically unsaturated polymerisable group of the general formula (II)

where:
    $R^1$ is hydrogen or a $C_1$-$C_4$ alkyl group;
    $A^1$ is —O— or —$NR^2$— wherein $R^2$ is hydrogen or $C_{1-4}$alkyl group or $R^2$ is BX where B and X are as defined above;
    (ii) 5 to 40wt % of styrene or a substituted styrene;
    (iii) 10 to 89wt % of a monomer (a) or mixture of monomers a), b) etc, which when polymerised form a polymer having a calculated Tg as calculated using $$\frac{1}{Tg} = \frac{Wa}{Tga} + \frac{Wb}{Tgb} + \ldots$$

wherein Tg=glass transition temperature in Kelvins
        Tga and Tgb=glass transition temperature of a homopolymer of a and b respectively in Kelvins
        Wa and Wb=weight fraction of component a and b respectively
    which is lower than the Tg of a homopolymer formed by polymerizing monomer (ii); and
    (iv) 0.5 to 10wt % of a monomer having a crosslinkable group wherein after crosslinking the polymer has
        (a) a Tg (dry) in the range from 15 of 90° C.;
        (b) a hydrated modulus at room temperature of at least 5 MPa;
        (c) hydrated elongation at break of at least 50%;
        (d) a water content in the range from 10 to 60%; and
    (v) wherein monomer (i) is 2-methacryloyloxyethyl-2'-trimethylammoniumethyl phosphate inner salt, monomer (ii) is styrene, monomer (iii) comprises methyl methacrylate, butyl acrylate and hydroxybutyl acrylate and monomer (iv) is trimethoxysilyl propyl methacrylate.

2. A method of forming a polymer comprising subjecting a monomer mixture comprising
(i) 5 to 40wt % of a hydrophilic monomer of the general formula (I)

$$Y\text{---}B\text{---}X \quad (I)$$

wherein B is a straight or branched alkylene, oxaalkylene or oligo-oxa-alkylene chain optionally containing one or more fluorine atoms up to and including perfluorinated chains or, if X contains a carbon-carbon chain between B and the centre of permanent positive charge or if Y contains a terminal carbon atom bonded to B, a valence bond;
X is a zwitterionic group and
Y is an ethylenically unsaturated polymerisable group of the general formula (II)

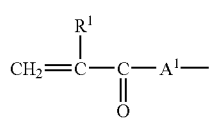

where:
$R^1$ is hydrogen or a $C_1$-$C_4$ alkyl group;
$A^1$ is —O— or —$NR^2$— wherein $R^2$ is hydrogen or $C_{1-4}$ alkyl group or $R^2$ is BX where B and X are as defined above;
(ii) 5 to 40wt % of styrene or a substituted styrene;
(iii) 10 to 89wt % of a monomer (a) or mixture of monomers a), b) etc, which when polymerised form a polymer having a calculated Tg as calculated using $$\frac{1}{Tg} = \frac{Wa}{Tga} + \frac{Wb}{Tgb} + \ldots$$

wherein Tg=glass transition temperature in Kelvins
Tga and Tgb=glass transition temperature of a homopolymer of a and b respectively in Kelvins
Wa and Wb=weight fraction of component a and b respectively
which is lower than the Tg of a homopolymer formed by polymerising monomer (ii);
(iv) 0.5 to 10wt % of a monomer having a crosslinkable group to free radical polymerisation to form a crosslinkable polymer, which, after crosslinking has
(a) a Tg (dry) in the range from 15 of 90° C.;
(b) a hydrated modulus at room temperature of at least 5 MPa;
(c) hydrated elongation at break of at least 50%; and
(d) a water content in the range from 10 to 60%; and
(v) wherein monomer (i) is 2-methacryloyloxyethyl-2'-trimethylammoniumethyl phosphate inner salt, monomer (ii) is styrene, monomer (iii) comprises methyl methacrylate, butyl acrylate and hydroxybutyl acrylate and monomer (iv) is trimethoxysilyl propyl methacrylate.

3. The method according to claim 2, wherein the free radical polymerisation is carried out in solution.

4. The method according to claim 3, wherein the polymer product is obtained by precipitating out from the solution and/or purified by a further step of diafiltration.

5. The method according to claim 3, wherein said solution is in isopropanol.

6. A composition comprising a polymer as defined in claim 1 and a further component.

7. The composition according to claim 6 in which the further component is a pharmaceutical active(s).

8. The composition according to claim 7, wherein the pharmaceutical active is selected from: rapamycin and analogues thereof selected from the group consisting of RAD001, tacrolimus, everolimus, Biolimus A9 and zotarolimus; tyrphostin; angiopeptin; carmustine; flavopiridol; gemcitabine; tecans selected from the group consisting of camptothecin, topotecan and irinotecan; lomustine; methotrexate; mitomycinl; paclitaxel and derivatives selected from the group consisting of docetaxel; actinomycin D; vincristinel; vinblastine; streptozotocin; capecitabine; vinorelbine; doxorubicin and other anthracyclines; dexamethasone and derivatives thereof selected from the group consisting of hydrophobic derivatives and dexamethasone phosphate; tetradecylselenoacetic acid; tetradecylthioacetic acid; ethyl isopropylamiloride; antithrombin; aggrastat; aspirin; cilostazol; clexane; clopidogrel; dipyridamole; persantine; eptifibatide; abciximabs; trapidil; batimastat; marimastat; VEGF; gene therapy agents; statins selected from the group consisting of avostatin, cerivastatin, flavastatin, lovastatin, rosuvastatin, sandostatin and simvastatin; carvedilol; estradiol, methoxyestradiol, L-arginine; nitric oxide donors; probucol; quinaprilat; thioctacid; telmisartan; zoledronate; and mixtures thereof.

9. A method of coating an implant comprising the steps of:
applying a polymer as claimed in claim 1 to the surface of the implant to form a polymer coating; and
crosslinking the polymer coating.

10. The method according to claim 9 wherein prior to applying the polymer, the surface of the implant is cleaned and/or plasma treated.

11. The method according to claim 9, wherein prior to applying the polymer, the surface of the implant is coated with a primer.

12. The method according to claim 11, wherein the primer comprises a silane.

13. The method according to claim 12, wherein the silanes includes at least one pendant group of formula (1)

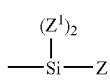

wherein Z is —$OR^{30}$ or Hal
$Z^1$ is —$OR^{30}$, Hal or alkyl
wherein $R^{30}$ is $C_{1-x}$alkyl or acyl and Hal is a halogen atom and x is 2 to 6.

14. The method according to claim 13, wherein the primer comprises bis[3-(trimethoxysilyl)propyl]amine.

15. The method according to claim 11, wherein the primer is applied as a liquid and the liquid is dried prior to applying the polymer.

16. The method according to claim 9, wherein the polymer is applied by dipping the implant in a solution containing the polymer.

17. The method according to claim 9, wherein the polymer is applied by spraying the surface of the implant with a solution containing the polymer.

18. The method according to claim 17, wherein the polymer solution further comprises a pharmaceutical active.

19. The method according to claim 9, wherein the polymer coating is crosslinked by application of heat.

20. The method of claim 19 wherein the cross-linking includes at least two separate steps carried out under different conditions of temperature and/or humidity and/or pressure.

21. The method according to claim 9, wherein the implant is a stent.

22. The method according to claim 9, wherein after crosslinking of the polymer coating, the stent is assembled on to a balloon catheter.

23. The method according to claim 22, wherein after assembly onto a balloon catheter, the stent is sterilised.

24. A polymer obtained by copolymerizing a monomer comprising the mixture comprising:
   i) 5 to 40wt% 2-methacryloyloxyethyl-2'-trimethylammoniumethyl phosphate inner salt;
   ii) 5 to 40wt % of styrene;
   iii) 10 to 89wt % of a mixture of methylmethacrylate, butyl acrylate and hydroxybutylacrylate; and
   iv) 0.5 to 10wt % of trimethoxysilylpropyl methacrylate.

25. A method of coating an implant comprising the steps of:
   applying a polymer as claimed in claim 24, to the surface of the implant to form a polymer coating; and
   crosslinking the polymer coating.

* * * * *

UNITED STATES PATENT AND TRADEMARK OFFICE
CERTIFICATE OF CORRECTION

PATENT NO. : 8,252,878 B2
APPLICATION NO. : 12/373412
DATED : August 28, 2012
INVENTOR(S) : Andrew Lennard Lewis et al.

It is certified that error appears in the above-identified patent and that said Letters Patent is hereby corrected as shown below:

Column 3, Lines 13 and 14: delete "2-ethyehexylacrylate" and insert --2-ethylhexylacrylate--
Column 3, Line 16: delete "dispole" and insert --dipole--
Column 4, Lines 62 and 63: delete "formula (I)," and insert --formula (I) and (II),--
Column 6, Line 17: delete "$_{eg.-(CH2)}$-" and insert --.g., -(CH$_2$)- --
Column 8, Line 49: delete "zwitterionics" and insert --zwitterionic--
Column 12, Line 57: delete "(VC)" and insert --(VIIIC)--
Column 12, Line 64: delete "more--carbon" and insert --more carbon--
Column 13, Lines 30 and 32: delete "t-butyidimethylsilyl" and insert --t-butyldimethylsilyl--
Column 18, Line 41: delete "zironate" and insert --zirconate--
Column 19, Line 29: delete "antirinthammabics" and insert --anti-inflammatories--
Column 19, Line 31: delete "cort costeroids" and insert --corticosteriods--
Column 19, Line 59: delete "curved" and insert --cured--

Signed and Sealed this
Nineteenth Day of February, 2013

Teresa Stanek Rea
*Acting Director of the United States Patent and Trademark Office*